US012785884B2

(12) United States Patent
Yang

(10) Patent No.: US 12,785,884 B2
(45) Date of Patent: Nov. 3, 2026

(54) TRANSMISSION PROCESSING METHOD AND APPARATUS, TERMINAL, NETWORK-SIDE DEVICE, AND STORAGE MEDIUM

(71) Applicant: VIVO MOBILE COMMUNICATION CO., LTD., Guangdong (CN)

(72) Inventor: Yu Yang, Guangdong (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 297 days.

(21) Appl. No.: 18/611,177

(22) Filed: Mar. 20, 2024

(65) Prior Publication Data

US 2024/0235761 A1 Jul. 11, 2024

Related U.S. Application Data

(63) Continuation of application No. PCT/CN2022/120140, filed on Sep. 21, 2022.

(30) Foreign Application Priority Data

Sep. 23, 2021 (CN) .......................... 202111117407.9

(51) Int. Cl.
*H04L 5/00* (2006.01)

(52) U.S. Cl.
CPC .......... *H04L 5/0048* (2013.01); *H04L 5/0053* (2013.01)

(58) Field of Classification Search
CPC ... H04L 5/0048; H04L 5/0053; H04L 5/0023; H04L 5/0044; H04L 5/0091; H04L 5/001;
(Continued)

(56) References Cited

U.S. PATENT DOCUMENTS

2021/0195602 A1* 6/2021 Venugopal ............ H04L 5/0091
2021/0204276 A1* 7/2021 Ge ........................ H04L 1/0026
(Continued)

FOREIGN PATENT DOCUMENTS

WO 2020217516 A1 10/2020
WO 2021143859 A1 7/2021
WO 2021155768 A1 8/2021

OTHER PUBLICATIONS

WO_2021143847_A1 (Year: 2021).*
(Continued)

*Primary Examiner* — Rushil P. Sampat

(57) ABSTRACT

This application discloses a transmission processing method and apparatus, a terminal, a network-side device, and a storage medium, and the transmission processing method includes: obtaining, by a terminal, target information; and determining, by the terminal based on the target information, whether a target object uses a target transmission configuration indicator state TCI state; where the target information is specified by a protocol or indicated by a network-side device, the target object is at least one of a channel state information reference signal CSI-RS and a sounding reference signal SRS, and the target TCI state includes at least one of the following: a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

20 Claims, 5 Drawing Sheets

(58) Field of Classification Search
CPC .. H04L 5/0012; H04L 5/0026; H04W 52/146; H04W 52/325; H04W 72/1278; H04W 72/20; H04B 7/0404; H04B 7/0456
See application file for complete search history.

(56) References Cited

U.S. PATENT DOCUMENTS

| | | | | |
|---|---|---|---|---|
| 2022/0264475 | A1* | 8/2022 | Yi | H04W 52/42 |
| 2022/0345272 | A1* | 10/2022 | Guo | H04L 5/0048 |
| 2023/0397217 | A1* | 12/2023 | Chung | H04L 5/0094 |
| 2024/0397523 | A1* | 11/2024 | Park | H04B 7/06966 |

OTHER PUBLICATIONS

VIVO, "Further discussion on multi beam enhancement", 3GPP TSG RAN WG1 #106-e, R1-2106571, e-Meeting, Aug. 16-27, 2021.
Samsung, "Moderator summary#2 for multi-beam enhancement: ROUND 1", 3GPP TSG RAN WG1 #106-e, R1-2108325, e-Meeting, Aug. 16-27, 2021.
Ericsson, "Enhancements on Multi-beam Operation", 3GPP TSG-RAN WG1 Meeting #106-e, R1-2107628, Aug. 6, 2021.
Samsung, "Multi-beam enhancements", 3GPP TSG RAN WG1 #106-e, R1-2106865, Aug. 6, 2021.
First Office Action dated Dec. 9, 2024 received in corresponding patent family application No. CN202111117407.9. English translation attached.
Grant Notice dated Apr. 22, 2025 received in corresponding patent family application No. CN202111117407.9. English translation attached.
Extended European Search Report dated Nov. 18, 2024 received in corresponding European Application No. EP22872001.7.
Notice of Reasons for Refusal dated May 13, 2025 received in corresponding patent family application No. JP2024518226. English translation attached.
International Search Report dated Dec. 27, 2022 in International Application No. PCT/CN2022/120140. English translation attached.
Written Opinion dated Dec. 27, 2022 in International Application No. PCT/CN2022/120140. English translation attached.
First Office Action dated Jun. 5, 2026 received in corresponding patent family application No. IN202417031085.

* cited by examiner

TRANSMISSION PROCESSING METHOD AND APPARATUS, TERMINAL, NETWORK-SIDE DEVICE, AND STORAGE MEDIUM

CROSS-REFERENCE TO RELATED APPLICATIONS

This application is a Bypass Continuation Application of PCT International Application No. PCT/CN2022/120140 filed on Sep. 21, 2022, which claims priority to Chinese patent application Ser. No. 202111117407.9 filed in China on Sep. 23, 2021, which are incorporated herein by reference in their entireties.

TECHNICAL FIELD

This application pertains to the field of communications technologies, and specifically relates to a transmission processing method and apparatus, a terminal, a network-side device, and a storage medium.

BACKGROUND

With the development of communications technologies, in a communications system, it is discussed that a plurality of channels or signals may use a same beam, and such beam may be referred to as a common beam. In a case that a network-side device indicates a common beam, how to determine beam information for each reference signal (for example, channel state information reference signal (CSI-RS) and/or sounding reference signal (SRS)) has become an urgent problem to be solved.

SUMMARY

According to a first aspect, a transmission processing method is provided, including:

- obtaining, by a terminal, target information; and
- determining, by the terminal based on the target information, whether a target object uses a target transmission configuration indicator state TCI state; where
- the target information is specified by a protocol or indicated by a network-side device, the target object is at least one of a channel state information reference signal CSI-RS and a sounding reference signal SRS, and the target TCI state includes at least one of the following:
- a TCI state for a terminal-dedicated physical downlink shared channel PDSCH and for all or part of dedicated control resource sets; and
- a TCI state for a dynamic-grant or configured-grant based physical uplink shared channel PUSCH and for all dedicated physical uplink control channels PUCCHs.

According to a second aspect, a transmission processing method is provided, including:

- sending, by a network-side device, target information to a terminal; where the target information is used to indicate whether a target object uses a target transmission configuration indicator state TCI state; where
- the target object is at least one of a channel state information reference signal CSI-RS and a sounding reference signal SRS, and the target TCI state includes at least one of the following:
- a TCI state for a terminal-dedicated physical downlink shared channel PDSCH and for all or part of dedicated control resource sets; and
- a TCI state for a dynamic-grant or configured-grant based physical uplink shared channel PUSCH and for all dedicated physical uplink control channels PUCCHs.

According to a third aspect, a transmission processing apparatus is provided, including:

- an obtaining module, configured to obtain target information; and
- a determining module, configured to determine, based on the target information, whether a target object uses a target transmission configuration indicator state TCI state; where
- the target information is specified by a protocol or indicated by a network-side device, the target object is at least one of a channel state information reference signal CSI-RS and a sounding reference signal SRS, and the target TCI state includes at least one of the following:
- a TCI state for a terminal-dedicated physical downlink shared channel PDSCH and for all or part of dedicated control resource sets; and
- a TCI state for a dynamic-grant or configured-grant based physical uplink shared channel PUSCH and for all dedicated physical uplink control channels PUCCHs.

According to a fourth aspect, a transmission processing apparatus is provided, including:

- a sending module, configured to send target information to a terminal; where the target information is used to indicate whether a target object uses a target transmission configuration indicator state TCI state; where
- the target object is at least one of a channel state information reference signal CSI-RS and a sounding reference signal SRS, and the target TCI state includes at least one of the following:
- a TCI state for a terminal-dedicated physical downlink shared channel PDSCH and for all or part of dedicated control resource sets; and
- a TCI state for a dynamic-grant or configured-grant based physical uplink shared channel PUSCH and for all dedicated physical uplink control channels PUCCHs.

According to a fifth aspect, a terminal is provided, where the terminal includes a processor, a memory, and a program or instructions stored in the memory and capable of running on the processor, and when the program or the instructions are executed by the processor, the steps of the method according to the first aspect are implemented.

According to a sixth aspect, a terminal is provided, including a processor and a communication interface, where

- the processor is configured to obtain target information, and determine, based on the target information, whether a target object uses a target transmission configuration indicator state TCI state; where
- the target information is specified by a protocol or indicated by a network-side device, the target object is at least one of a channel state information reference signal CSI-RS and a sounding reference signal SRS; and
- the target TCI state includes at least one of the following:
  - a TCI state for a terminal-dedicated physical downlink shared channel PDSCH and for all or part of dedicated control resource sets; and
- a TCI state for a dynamic-grant or configured-grant based physical uplink shared channel PUSCH and for all dedicated physical uplink control channels PUCCHs.

According to a seventh aspect, a network-side device is provided, where the network-side device includes a processor, a memory, and a program or instructions stored in the memory and capable of running on the processor, and when the program or the instructions are executed by the processor, the steps of the method according to the second aspect are implemented.

According to an eighth aspect, a network-side device is provided, including a processor and a communication interface, where the communication interface is used to send target information to a terminal; where the target information is used to indicate whether a target object uses a target transmission configuration indicator state TCI state; where the target object is at least one of a channel state information reference signal CSI-RS and a sounding reference signal SRS, and the target TCI state includes at least one of the following:

a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

According to a ninth aspect, a readable storage medium is provided, where a program or instructions are stored in the readable storage medium, and when the program or the instructions are executed by a processor, the steps of the method according to the first aspect are implemented, or the steps of the method according to the second aspect are implemented.

According to a tenth aspect, an embodiment of this application provides a chip, where the chip includes a processor and a communication interface, the communication interface is coupled to the processor, and the processor is configured to run a program or instructions to implement the steps of the method according to the first aspect or implement the steps of the method according to the second aspect.

According to an eleventh aspect, a computer program/program product is provided, where the computer program/program product is stored in a non-transitory storage medium, and the computer program/program product is executed by at least one processor to implement the method according to the first aspect or the method according to the second aspect.

According to a twelfth aspect, a communication device is provided, configured to execute the method according to the first aspect or execute the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) mobile communications system.

Figure 1:
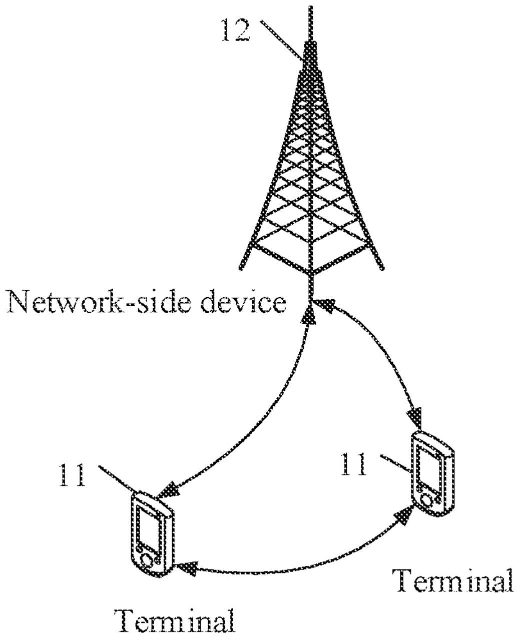
FIG. 1 is a structural diagram of a network system to which the embodiments of this application are applicable.

FIG. 1 is a block diagram of a wireless communication system to which the embodiments of this application are applicable. The wireless communication system includes a terminal 11 and a network-side device 12. The terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), an augmented reality (AR)/virtual reality (VR) device, a robot, a wearable device, vehicle user equipment (VUE), pedestrian user equipment (PUE), and a smart home device (a home device with wireless communication function, such as refrigerator, TV, washing machine, or furniture). The wearable device includes: a smart watch, a wrist band, smart earphones, smart glasses, smart jewelry (smart bracelet, smart wristband, smart ring, smart necklace, smart anklet, smart ankle bracelet, or the like), smart wristband, smart clothing, game console, and the like. It should be noted that a specific type of the terminal 11 is not limited in the embodiments of this application. The network-side device 12 may be a base station or a core network device. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area network (WLAN) access point, a wireless fidelity (WiFi) node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

For ease of understanding, the following describes some content included in the embodiments of this application.

1. Beam Indication Mechanism

In the 5th generation (5G) mobile communication NR system, after beam measurement and beam reporting, the network-side device may perform beam indication for downlink and uplink channels or reference signals, so as to establish beam links between the network-side device and the UE, thereby implementing channel or reference signal transmission.

The beam indication mechanism for CSI-RS is as follows:

in a case that a CSI-RS type is periodic CSI-RS, the network-side device configures beam information for a CSI-RS resource by using radio resource control (RRC) signaling;

in a case that the CSI-RS type is semi-persistent CSI-RS, the network-side device indicates beam information for the CSI-RS when activating a CSI-RS resource from an RRC-configured CSI-RS resource set by using a medium access control control element (MAC CE) command;

When a CSI-RS type is an aperiodic CSI-RS, the network-side device configures beam information for the CSI-RS by using RRC signaling, and triggers the CSI-RS by using downlink control information (DCI).

Optionally, the beam information described in this application may also be referred to as: spatial relation information, spatial domain transmission filter information, spatial domain reception filter information, spatial filter information, transmission configuration indicator state (TCI state) information, quasi co-location (QCL) information, QCL parameter, or the like. Downlink beam information may usually be represented by using TCI state information or QCL information. Uplink beam information may be usually represented by using spatial relation information.

2. Default Beam Mechanism for Aperiodic CSI-RSs

In the 5G NR system, the default beam mechanism for aperiodic CSI-RSs is defined as follows:

If a scheduling offset between the last symbol of a physical downlink control channel (PDCCH) carrying triggered DCI and the first symbol of an aperiodic CSI-RS resource in a non-zero power (NZP) CSI reference signal (RS) (NZP-CSI-RS) resource set (the NZP-CSI-RS resource set is not configured with a higher layer parameter trs-Info (trs-Info is a parameter for a tracking reference signal (TRS) message)) is less than a UE-reported threshold BeamSwitchTiming, when a reported value is one of the values {14,28, 48} and enableBeamSwitchTiming (enableBeamSwitchTiming is a parameter for enabling beam switching timing) is not configured; or when the scheduling offset is less than 48, where the UE reports beamSwitchTiming-r16 (beamSwitchTiming-r16 is a beam switching timing parameter of release 16 (R16)), enableBeamSwitchTiming is configured, and a higher layer parameter repetition configured for the NZP-CSI-RS resource set is set to "off" or the higher layer parameter repetition is not configured; or when the scheduling offset is less than a UE-reported threshold beamSwitchTiming-r16, where enableBeamSwitchTiming is configured, and a higher layer parameter repetition configured for the NZP-CSI-RS resource set is set to "on", the following behavior is performed:

perform a first behavior in a case that condition 1 is satisfied; where condition 1 includes: if enableDefaultTCI-StatePercoResetPoolidex (enableDefaultTCI-StatePercoResetPoolidex means using a default TCI state parameter for each control resource set (CORESET) pool index) is configured for the UE, and a higher-layer parameter PDCCH Config (PDCCH Config is a parameter configured for PDCCH) is configured for the UE, the control resource set for the parameter contains two different control resource set pool index values. The first behavior includes:

If any other downlink (DL) signal using a TCI state indicated by the network-side device is present in a same symbol as the CSI-RS, the UE applies a QCL assumption of another DL signal to receive the aperiodic CSI-RS. The another DL signal refers to a physical downlink shared channel (PDSCH) that is scheduled by a PDCCH. The PDCCH for scheduling the PDSCH is associated with a same coresetPoolIndex with a PDCCH for triggering the aperiodic CSI-RS, and a scheduling offset is greater than or equal to a threshold timeDurationForQCL. The another DL signal alternatively refers to another aperiodic CSI-RS, where a PDCCH for triggering the another aperiodic CSI-RS is associated with a same coresetPoolIndex as a PDCCH for triggering the CSI-RS; and a scheduling offset for the another aperiodic CSI-RS is greater than or equal to the UE-reported threshold beamSwitchTiming, where the UE reports one of the values {14,28,48} and enableBeamSwitchTiming is not configured. The another DL signal alternatively refers to another aperiodic CSI-RS, where a PDCCH for triggering the another aperiodic CSI-RS is associated with a same coresetPoolIndex as a PDCCH for triggering the CSI-RS, and a scheduling offset for the another aperiodic CSI-RS is greater than or equal to 48, where the UE-reported beamSwitchTiming-r16 is one of values {224,336} and enableBeamSwitchTiming is configured. The another DL signal alternatively refers to a periodic CSI-RS or a semi-persistent CSI-RS.

Otherwise, the UE receives the CSI-RS by applying a QCL parameter for a CORESET associated with a listening search space. The CORESET is a CORESET with a smallest control resource set identifier (controlResourceSetId) in a nearest slot in CORESETs configured with a same coresetPoolIndex value as the PDCCH for triggering the CSI-RS. In the nearest slot, one or more CORESETs are associated with a same coresetPoolIndex value as the PDCCH for triggering the CSI-RS.

A second behavior is performed in a case that condition 2 is satisfied or that condition 2 is satisfied and condition 1 is not satisfied; where condition 2 includes: if enableTwoDefaultTCI-States (enableTwoDefaultTCI-States is a parameter for enabling two default TCL States) is configured for the UE, and at least one TCI code point is mapped to two TCI states. The second behavior includes:

If any other DL signal using a TCI state indicated by the network-side device is present in a same symbol as the CSI-RS, the UE applies a QCL assumption of another DL signal to receive the CSI-RS. The another DL signal refers to a PDSCH with a scheduling offset being greater than or equal to the threshold timeDurationForQCL. The another DL signal alternatively refers to another aperiodic CSI-RS, and a scheduling offset of the another aperiodic CSI-RS is greater than or equal to the UE-reported threshold beam-SwitchTiming, where the UE reports one of the values {14,28,48} and enableBeamSwitchTiming is not configured. The another DL signal alternatively refers to another aperiodic CSI-RS, and a scheduling offset of the another aperiodic CSI-RS is greater than or equal to 48, where UE-reported beamSwitchTiming-r16 is one of the values {224, 336} and enableBeamSwitchTiming is configured. The another DL signal alternatively refers to a periodic CSI-RS or a semi-persistent CSI-RS. If two TCI states are indicated for a PDSCH present in the same symbol as the CSI-RS, the UE applies the 1st TCI state of the two TCI states when receiving the aperiodic CSI-RS.

Otherwise, the UE applies the 1st TCI state of two TCI states corresponding to the lowest TCI code point, where the lowest TCI code point is a lowest code point of all TCI code points corresponding to the two TCI states, and is applicable to PDSCHs within an active bandwidth part (BWP) of a cell in which the aperiodic CSI-RS is located.

In a case that condition 3 is satisfied and neither of condition 1 and condition 2 is satisfied, a third behavior is performed; where condition 3 includes: any other DL signal using the TCI state indicated by the network-side device is present in the same symbol as the CSI-RS. The third behavior includes:

The UE applies a QCL assumption of the another DL signal to receive an aperiodic CSI-RS. The another DL signal refers to a PDSCH with a scheduling offset being greater than or equal to the threshold timeDurationForQCL. The another DL signal alternatively refers to a periodic CSI-RS or a semi-persistent CSI-RS. The another DL signal alternatively refers to another aperiodic CSI-RS, and a scheduling offset of the another aperiodic CSI-RS is greater than or equal to the UE-reported threshold beamSwitchTiming, where the UE reports one of the values {14,28,48} and enableBeamSwitchTiming is not configured. The another DL signal alternatively refers to another aperiodic CSI-RS, and a scheduling offset of the another aperiodic CSI-RS is greater than or equal to the UE-reported threshold beam-SwitchTiming, where a higher layer parameter trs-Info is configured for the NZP-CSI-RS resource set. The another DL signal alternatively refers to another aperiodic CSI-RS, and a scheduling offset of the another aperiodic CSI-RS is greater than or equal to 48, where the UE has reported beamSwitchTiming-r16, enableBeamSwitchTiming is configured, and a higher layer parameter repetition configured for the NZP-CSI-RS resource set is set to "off" or the higher layer parameters repetition and trs-info are not configured. The another DL signal alternatively refers to another aperiodic CSI-RS, and a scheduling offset of the another aperiodic CSI-RS is greater than or equal to the UE-reported threshold beamSwitchTiming-r16, where enableBeam-SwitchTiming is configured, and the higher layer parameter repetition configured for the NZP-CSI-RS resource set is set to "on".

In a case that condition 4 is satisfied and none of condition 1, condition 2, and condition 3 is not satisfied, a fourth behavior is performed; where condition 4 includes: the network-side device configures at least one CORESET for a BWP in which the aperiodic CSI-RS is located. The fourth behavior includes: the UE receives the CSI-RS by applying a QCL parameter for a CORESET associated with a listening search space, where the CORESET is a CORESET that has a smallest controlResourceSetId in the nearest slot, and one or more CORESETs monitored by the UE are present in an active BWP of the serving cell in the nearest slot.

In a case that none of condition 1, condition 2, condition 3, and condition 4 is not satisfied, if enableDefaultBeam-ForCCS (enableDefaultBeamForCCS is a parameter for enabling a default beam for common channel signaling (CCS)) is configured for the UE, the UE applies a QCL assumption of an activated TCI state with a smallest identifier (ID) to receive the aperiodic CSI-RS, where the activated TCI state is used for a PDSCH within an active BWP of a cell in which the aperiodic CSI-RS is located.

3. Power Control Parameter for Sounding Reference Signal (SRS)

Power control parameters p0 and alpha for the SRS can be determined based on the p0 and alpha parameters configured by the network-side device for each SRS resource set, and the network-side device can also update or reassign the parameters via RRC.

For a pathloss parameter in the power control parameter, when a pathloss reference signal (pathlossReferenceRS) is configured for one SRS resource set, the pathloss of the set is determined based on the pathloss RS configured for the SRS resource set.

In a case that the pathlossReferenceRS is not configured, the network-side device can configure a pathloss (PL) reference signal list in the SRS resource set, that is, configuring a plurality of pathloss RSs, and also determines one pathloss RS from the plurality of pathloss RSs via a MAC CE, for determining a pathloss of the SRS resource set. The foregoing is only for the aperiodic and semi-persistent SRS resource sets. After the enablePL-RS-UpdateForPUSCH-SRS (the enablePL-RS-UpdateForPUSCH-SRS parameter is a parameter for enabling PL RS update for the PUSCH-SRS) parameter is configured, the pathloss RS may be selected or updated via a MAC CE.

4. Third Generation Partnership Project (3GPP) Release 17 (R17) Unified TCI Framework (3GPP R17 Unified TCI Framework)

The TCI state includes a joint TCI state and a separate TCI state, where the former uses a same TCI state for a plurality of downlink and uplink channels, and the latter includes a separate downlink (separate DL) TCI state used for a plurality of downlink channels and a separate uplink (separate UL) TCI state used for a plurality of uplink channels.

The DL TCI state may be used for a terminal-dedicated (UE-dedicated) PDSCH and for part or all of the terminal-dedicated control resource set, or may be used for UE-dedicated reception on PDSCH and for UE-dedicated reception on part or all of the CORESETs.

The UL TCI state may be used for dynamic-grant or configured-grant based physical uplink shared channel (PUSCH) and all dedicated physical uplink control channel (PUCCH) resources.

In an intra-cell beam indication mechanism, a demodulation reference signal (DMRS) associated with a control resource set and non-terminal-dedicated reception on an associated PDSCH can use a TCI state indicated by the network-side device for a terminal-dedicated PDSCH and part or all of the terminal-dedicated control resource sets.

In an inter-cell beam indication mechanism, channels/signals other than non-terminal-dedicated channels or signals can use the TCI state indicated by the network-side device for the terminal-dedicated PDSCH and part or all of the terminal-dedicated control resource sets.

Both an aperiodic CSI-RS for CSI and an aperiodic CSI-RS for beam management (BM) can use the TCI state indicated by the network-side device for the terminal-dedicated PDSCH and part or all of the terminal-dedicated control resource sets.

An aperiodic SRS resource or resource set for BM and an SRS resource or resource set for codebook-based uplink transmission/non-codebook-based uplink transmission for antenna switching may use a TCI state indicated by the network-side device for a dynamic-grant or configured-grant based PUSCH and all dedicated PUCCH resources.

It should be noted that the terminal-dedicated channel in the embodiments of this application may also be referred to as terminal-dedicated signal, and the foregoing condition 1 can be understood as that: at least two different control resource set pool index values are configured for the terminal and that a default beam is enabled for each of the control resource set pool indexes (the higher-layer parameter enableDefaultTCI-StatePerCoresetPoolIndex is configured).

The foregoing condition 2 can be understood as that: a mode of enabling at least two default beams is configured for the terminal and at least one TCI code point corresponds to at least two TCI states during activation of the TCI state (the higher-layer parameter enableTwoDefaultTCI-States is configured).

The following describes in detail a transmission processing method provided in the embodiments of this application by using some embodiments and application scenarios thereof with reference to the accompanying drawings.

Figure 2:
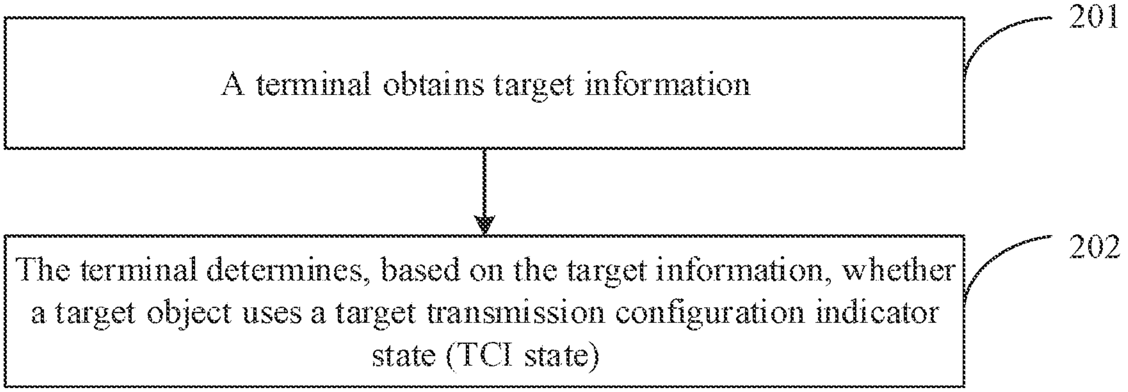
FIG. 2 is a flowchart of a transmission processing method according to an embodiment of this application.

Referring to FIG. 2, FIG. 2 is a flowchart of a transmission processing method according to an embodiment of this application. As shown in FIG. 2, the method includes the following steps.

Step 201: A terminal obtains target information.

Step 202: The terminal determines, based on the target information, whether a target object uses a target transmission configuration indicator state TCI state.

The target information is specified by a protocol or indicated by a network-side device, the target object is at least one of a channel state information reference signal CSI-RS and a sounding reference signal SRS, and the target TCI state includes at least one of the following:

- a TCI state for a terminal-dedicated physical downlink shared channel PDSCH and for all or part of dedicated control resource sets; that is, for UE-dedicated reception on PDSCH and for UE-dedicated reception on part or all of the CORESETs; and
- a TCI state for a dynamic-grant or configured-grant based physical uplink shared channel PUSCH and for all dedicated physical uplink control channels PUCCHs.

In this embodiment of this application, the target TCI state may be understood as a TCI state for indicating a common beam. Based on the target information, the terminal may determine whether the target object uses the target TCI state. If the target TCI state is used, it indicates that the common beam is used, and if the target TCI state is not used, it indicates that the common beam is not used. In this case, another preconfigured beam, or another beam indicated by the network, or a default beam may be used.

It should be understood that the CSI-RS may include only an aperiodic CSI-RS, and the SRS may include only an aperiodic SRS.

Optionally, the target TCI state may be understood to be a separate DL TCI state when the target TCI state is a TCI state for a terminal-dedicated PDSCH and for all or part of dedicated control resource sets; or the target TCI state may be understood as a separate UL TCI state when the target TCI state is a TCI state for a dynamic-grant or configured-grant based PUSCH and for all dedicated physical uplink control channels PUCCHs. The target TCI state may be understood as a joint TCI state when the target TCI state is used for the terminal-dedicated PDSCH and for all or part of dedicated control resource sets, and is also used for the dynamic-grant or configured-grant based PUSCH and for all dedicated PUCCHs.

It should be noted that default beam information for the CSI-RS and/or SRS indicated by the network-side device may be used when it is determined based on the target information to use the common beam for the CSI-RS and/or SRS.

In this embodiment of this application, the target information is obtained by the terminal; and the terminal determines, based on the target information, whether a target object uses a target transmission configuration indicator state TCI state; where the target information is specified by the protocol or indicated by the network-side device, the target object is at least one of a channel state information reference signal CSI-RS and a sounding reference signal SRS, and the target TCI state includes at least one of the following: a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs. In this way, in a case that the network-side device indicates a common beam, the terminal can determine, based on the target information, whether the CSI-RS and/or the SRS uses the target TCI state, and then may determine beam information for the CSI-RS and/or the SRS, so as to ensure that the terminal and the network-side device have consistent understanding on a beam during transmission of the CSI-RS and/or the SRS to guarantee beam alignment.

Optionally, in some embodiments, the target information satisfies at least one of the following:

- the target information is used for indicating whether all of the target objects use the target TCI state;
- the target information is used for indicating whether all target objects in a resource set corresponding to the target object uses the target TCI state;
- the target information is used for indicating whether a resource corresponding to the target object uses the target TCI state;
- the target information is used for indicating whether all target objects in a configuration corresponding to the target object uses the target TCI state; and
- the target information is used for indicating whether the target objects for different purposes use the target TCI state.

Optionally, in a case that the target information may be indicated by the network-side device, the target information is carried in any one of the following configuration information:

- configuration information for a resource set of the target object;
- configuration information for the target object;

configuration information for a resource of the target object;

configuration information for a cell to which the target object belongs;

configuration information for a bandwidth part BWP to which the target object belongs;

configuration information for a cell group to which the target object belongs; and configuration information for a frequency band to which the target object belongs.

For example, when the target information is in CSI-RS resource configuration, or configuration information for a CSI-RS resource set or CSI-RS resource, it may be used to indicate whether the CSI-RS uses the target TCI state; and when the target information is in configuration information for an SRS resource set or SRS resource, it may be used to indicate whether the SRS uses the target TCI state. When the target information corresponds to SRS resource sets of different usages, it may be used to indicate whether the SRS resource set of each usage uses the target TCI state.

Optionally, in some embodiments, in a case that the target object includes an aperiodic first CSI-RS and a target condition is satisfied, a TCI state for the first CSI-RS is a first TCI state, a second TCI state, a third TCI state, or a fourth TCI state.

The target condition includes: a time domain offset between a first PDCCH triggering the first CSI-RS and the first CSI-RS is less than a first preset value.

It should be understood that in this embodiment of this application, the target condition may further include other conditions in addition to the foregoing condition, for example, it may also include the following condition:

The first preset value is a UE-reported threshold beam switch timing, where the reported value is one of the values {14,28,48} and enableBeamSwitchTiming is not configured, or a first preset value is 48, where the UE reports beamSwitchTiming-r16, enableBeamSwitchTiming is configured, and a higher layer parameter repetition configured for the NZP-CSI-RS resource set is set to "off" or the higher layer parameters repetition is not configured, or the first preset value is a UE-reported threshold beamSwitchTiming-r16, where enableBeamSwitchTiming is configured and the higher layer parameter repetition configured for the NZP-CSI-RS resource set is set to "on".

It should be noted that in this embodiment of this application, for the first CSI-RS, if the time domain offset between the first CSI-RS and the first PDCCH triggering the first CSI-RS is less than the first preset value, the TCI state for the first CSI-RS may use a first TCI state, a second TCI state, a third TCI state, or a fourth TCI state; or if the time domain offset between the first CSI-RS and the first PDCCH triggering the first CSI-RS is greater than or equal to the first preset value, it is determined, based on the target information, whether the first CSI-RS uses the target TCI state.

Optionally, in some embodiments, the first TCI state satisfies at least one of the following:

the first TCI state is a TCI state used for a first downlink signal, the first downlink signal being transmitted in a same time unit as the first CSI-RS;

the first TCI state is the target TCI state;

the first TCI state is a TCI state indicated by the network-side device for the first downlink signal and the first TCI state is different from the target TCI state; and the first TCI state is a TCI state indicated by the network-side device for a second PDCCH, and the first TCI state is different from the target TCI state, where the second PDCCH is used for triggering or scheduling the first downlink signal.

In this embodiment of this application, the first TCI state may be the target TCI state or may be another TCI state different from the target TCI state.

Optionally, the second PDCCH for scheduling or triggering the first downlink signal is carried in a non-terminal-dedicated control resource set, or the second PDCCH is carried in a common search space (CSS).

In this embodiment of this application, scheduling or triggering the first downlink signal may be understood as scheduling the first PDSCH or triggering the second CSI-RS.

Optionally, the first downlink signal is a first PDSCH or is an aperiodic second CSI-RS.

In this embodiment of this application, the second CSI-RS may be a periodic CSI-RS, an aperiodic CSI-RS, or a semi-persistent CSI-RS.

Optionally, in a case that the network-side device indicates a plurality of TCI states, the first TCI state is the N-th TCI state in the plurality of TCI states, N is a second preset value, and the plurality of TCI states satisfy at least one of the following:

the plurality of TCI states are used for a terminal-dedicated physical downlink shared channel PDSCH and for all or part of dedicated control resource sets;

the plurality of TCI states are used for a dynamic-grant or configured-grant based physical uplink shared channel PUSCH and for all dedicated physical uplink control channels PUCCHs;

the plurality of TCI states are used for the first downlink signal; and the plurality of TCI states are used for the second PDCCH.

In this embodiment of this application, the network-side device may indicate a plurality of TCI states for the terminal when the condition 5 is satisfied and none of conditions 1 to 4 is satisfied.

Optionally, in some embodiments, the second TCI state is a TCI state for a periodic or semi-persistent second CSI-RS, the TCI state of the second CSI-RS is a TCI state different from the target TCI state, and the second CSI-RS is transmitted in a same time unit as the first CSI-RS.

Optionally, the third TCI state is a TCI state for the first control resource set, and the first control resource set satisfies at least one of the following:

a control resource set pool index for the first control resource set is the same as a control resource set pool index associated with the first PDCCH;

an index of the first control resource set is a smallest control resource set index;

the first control resource set is located in a target slot closest to the first CSI-RS, and in the target slot, a control resource set pool index for at least one control resource set is the same as the control resource set pool index associated with the first PDCCH;

the first control resource set is located in the target slot closest to the first CSI-RS, and at least one control resource set is present in the target slot; and the first control resource set is located in an active bandwidth part BWP of a serving cell.

In this embodiment of this application, the first control resource set may be a terminal-dedicated control resource set (which may also be referred to as that at least one of associated search spaces is a control resource set of a terminal-dedicated search space, or all of the associated search spaces are control resource sets of the terminal-dedicated search space), or may be a non-terminal-dedicated control resource set (which may also be referred to as that at least one of the associated search spaces is a control resource set of a non-terminal-dedicated search space, or all of the associated search spaces are control resource sets of the non-terminal-dedicated search space). The TCI state for the first control resource set varies in different cases, as described in more detail below.

For example, in some embodiments, in a case that the first control resource set is a terminal-dedicated control resource set, the TCI state for the first control resource set is the target TCI state.

In some embodiments, in a case that the first control resource set is a non-terminal-dedicated control resource set and the network-side device indicates an intra-cell TCI state, the third TCI state satisfies any one of the following:

the third TCI state is the target TCI state; and the third TCI state is different from the target TCI state.

In a case that the first control resource set is a non-terminal-dedicated control resource set and the network-side device indicates an inter-cell TCI state, the third TCI state satisfies at least one of the following:

the third TCI state is different from the target TCI state;

the third TCI state is a TCI state associated with a physical cell identifier (PCI) of the serving cell;

the third TCI state is the target TCI state;

the third TCI state is a TCI state associated with a PCI of a non-serving cell; and the third TCI state is a TCI state for a default PCI.

Optionally, in some embodiments, the fourth TCI state satisfies at least one of the following:

the fourth TCI state is the target TCI state;

the fourth TCI state is a preset TCI state in a plurality of TCI states, and the plurality of TCI states is a plurality of target TCI states;

the fourth TCI state is a TCI state most recently indicated by the network-side device;

the fourth TCI state is a preset TCI state in a plurality of TCI states most recently indicated by the network-side device; and the fourth TCI state is a fifth TCI state; where the fifth TCI state is a preset TCI state in L TCI states, the L TCI states are one or more TCI states corresponding to a lowest TCI code point in all TCI states activated by the network-side device, or the L TCI states are a plurality of TCI states corresponding to a lowest target code point in TCI states activated by the network-side device, and the target code point is a TCI code point corresponding to at least two TCI states.

In this embodiment of this application, when the network-side device indicates one target TCI state, the fourth TCI state may be directly the target TCI state; or when the network-side device indicates a plurality of target TCI states, the fourth TCI state may be a preset TCI state in the plurality of target TCI states, for example, the N-th target TCI state.

Optionally, when there is one TCI state most recently indicated by the network-side device, the fourth TCI state may be directly the TCI state most recently indicated by the network-side device; and when there are a plurality of TCI states most recently indicated by the network-side device, the fourth TCI state may be a preset TCI state in the plurality of TCI states most recently indicated by the network-side device, for example, the N-th TCI state.

It should be noted that the network-side device may first activate the TCI state via a MAC CE and then indicate the TCI state via DCI. The indicated or activated TCI state is a TCI state for an active BWP of a cell in which the first CSI-RS is located.

Optionally, the fourth TCI state is a fifth TCI state in a case that the first CSI-RS satisfies any one of the following conditions:

a transmission time of the first CSI-RS is located within a time period between activation of the TCI state by the network-side device and indication of the TCI state;

an interval between the transmission time of the first CSI-RS and a time for most recently indicating the TCI state by the network-side device is greater than or equal to a preset duration; and the network-side device reactivates a TCI state between the time for most recently indicating the TCI state by the network-side device and the transmission time of the first CSI-RS.

In this embodiment of this application, a scenario for using an activated TCI state may be determined based on the foregoing conditions.

Optionally, in some embodiments, the plurality of TCI states satisfy at least one of the following:

at least two TCI states correspond to different control resource set pool indexes;

at least two TCI states correspond to different channel groups; and at least two TCI states correspond to different terminal panels.

In this embodiment of this application, the plurality of TCI states may be that part or all of the TCI states correspond to different control resource set pool indexes, part or all of the TCI states correspond to different channel groups, or part or all of the TCI states correspond to different terminal panels.

Optionally, in some embodiments, the TCI state for the first CSI-RS is determined according to a target rule, the target rule including at least one of the following:

in a case that a first preset condition is satisfied, a second preset condition is satisfied, or a third preset condition is satisfied and neither the first preset condition nor the second preset condition is satisfied, the TCI state for the first CSI-RS is determined based on a preset rule;

in a case that a fourth preset condition is satisfied and none of the first preset condition, the second preset condition, and the third preset condition is satisfied, the TCI state for the first CSI-RS is the third TCI state; and in a case that the fifth preset condition is satisfied and none of the first preset condition, the second preset condition, the third preset condition, and the fourth preset condition is satisfied, the TCI state for the first CSI-RS is the fourth TCI state.

Optionally, the first preset condition includes: at least two different control resource set pool index values are configured for the terminal and a default beam is started for each control resource set pool index.

Optionally, the second preset condition includes: a mode of enabling at least two default beams is configured for the terminal and at least one TCI code point corresponds to at least two TCI states during activation of the TCI state.

Optionally, the third preset condition includes: a first downlink signal transmitted in a same time unit as the first CSI-RS is present.

Optionally, the fourth preset condition includes any one of the following:

the network-side device configures at least one control resource set for a BWP in which the first CSI-RS is received;

- the network-side device configures at least one terminal-dedicated control resource set for a BWP in which the first CSI-RS is received; and
- the network-side device configures at least one non-terminal-dedicated control resource set for a BWP in which the first CSI-RS is received.

Optionally, the fifth preset condition includes: the network-side device configures a first parameter for the terminal, the first parameter being used to indicate starting a default beam used for cross-carrier scheduling.

Optionally, in some embodiments, the preset rule satisfies at least one of the following:

- a first downlink signal transmitted at a same time as the first CSI-RS is present and, in a case that a first sub-condition is satisfied, the TCI state for the first CSI-RS is the first TCI state;
- in a case that a second sub-condition is satisfied, the TCI state for the first CSI-RS is the second TCI state;
- in a case that both the first preset condition is satisfied and the third sub-condition is satisfied, the TCI state for the first CSI-RS is the third TCI state; and
- in a case that the second preset condition is satisfied and the third sub-condition is satisfied, the TCI state for the first CSI-RS is the fourth TCI state.

Optionally, the first sub-condition includes at least one of the following:

- a second PDCCH for scheduling or triggering the first downlink signal is associated with a same control resource set pool index as the first PDCCH;
- in a case that the first downlink signal is the first PDSCH, a time domain offset value between a PDCCH for scheduling the first PDSCH and the first PDSCH is greater than or equal to a first preset threshold; and
- in a case that the first downlink signal is an aperiodic second CSI-RS, a time domain offset between a PDCCH for triggering the second CSI-RS and the second CSI-RS is greater than or equal to a second preset threshold.

Further, in a case that the first downlink signal is an aperiodic second CSI-RS, the first sub-condition further includes any one of the following:

- the terminal has reported a first value and a second parameter is not configured for the terminal, where the first value is 14, 28, or 48, and the second parameter is used to enable beam switching timing;
- the terminal has reported a second value and the second parameter is configured for the terminal, the second value being 224 or 336;
- tracking reference signal information trs-Info is configured for the terminal;
- the terminal has reported the second value, the second parameter is configured for the terminal, and a repetition parameter configured for the second CSI-RS is off, or neither the repetition parameter nor the trs-Info is configured for the second CSI-RS; and
- the terminal has reported the second value, the second parameter is configured for the terminal, and the repetition parameter configured for the second CSI-RS is on.

Optionally, the second sub-condition includes: a first downlink signal transmitted in a same time unit as the first CSI-RS is a periodic or semi-persistent second CSI-RS.

Optionally, the third sub-condition includes: a first downlink signal transmitted in a same time unit as the first CSI-RS is absent.

Optionally, in a case that the SRS uses the target TCI state, a power control parameter for the SRS satisfies at least one of the following:

- a pathloss reference signal uses a pathloss signal in the target TCI state or a pathloss signal associated with the target TCI state, or uses a source reference signal in the target TCI state, a quasi co-location type of the source reference signal being type D; and
- a target power control parameter satisfies a sixth preset condition, and the target power control parameter includes at least one power control parameter in power control parameters of the SRS other than the pathloss reference signal; where
- the sixth preset condition satisfies at least one of the following:
- the target power control parameter is associated with the target TCI state; and
- in a case that the target power control parameter is not associated with the target TCI state, a parameter value of the target power control parameter is a default value in candidate values or is a value indicated by the network-side device from the candidate values.

In this embodiment of this application, the candidate value may be configured by at least one of the following: BWP configuration information, SRS configuration information, SRS resource set configuration information, and SRS resource configuration information. It should be understood that in a case that the SRS does not use a common beam or does not use a target TCI state, the target power control parameter may be determined in accordance with existing related technologies.

Further, in a carrier aggregation (CA) scenario, it is also necessary to consider a validation time of the TCI state, and the validation time may be understood as a beam application time (BAT). For example, in some embodiments, the method further includes:

- when the terminal is in a carrier aggregation scenario, receiving, by the terminal, configuration information from the network-side device, where the configuration information is used to configure target parameter information, and the target parameter information is used to indicate a validation time of the target TCI state.

In this embodiment of this application, the target parameter information may be understood as parameter information for a BAT, for which a time granularity may be defined as millisecond (ms), slot or symbol. For example, Y milliseconds, Y slots or Y symbols may be included.

Optionally, the target parameter information is carried in any one of the following configuration information:

- configuration information for a frequency band;
- configuration information for a component carrier (CC) list;
- configuration information for a CC;
- configuration information for a BWP;
- configuration information for a cell; and
- configuration information for a PUCCH.

The target parameter information includes at least one Y value, and the at least one Y value including any one of the following:

- a Y value for each sub-carrier spacing (SCS);
- a Y-value for a first SCS, where the first SCS is an SCS of a BWP of a cell in which a PUCCH carrying an acknowledgement (ACK) of signaling for indicating the target TCI state by the network-side device is located;
- a Y value for each BWP in a set of component carriers CCs;

a Y value for each BWP in CCs within a frequency band; and one Y value shared by a plurality of first objects; where the first object is a target BWP, a subcarrier spacing SCS of the target BWP, a target CC, a CC list to which the target CC belongs, or a frequency band to which the target CC belongs; where the target BWP is a BWP in which a channel for applying the target TCI state is located, and the target CC is a CC in which a channel for applying the target TCI state is located.

Optionally, in some embodiments, after the receiving, by the terminal, configuration information from the network-side device, the method further includes:

determining, by the terminal, a validation time for each BWP in each CC based on a second object; where the second object includes any one of the following:

a BWP of a first CC, where the first CC is a CC in which a channel applying the target TCI state is located;

an SCS of the BWP of the first CC;

the BWP of the first CC and a BWP of the second CC, where the second CC is a CC in which an ACK of signaling for indicating the target TCI state by the network-side device is located;

the SCS of the BWP of the first CC and an SCS of the BWP of the second CC;

a BWP corresponding to a second SCS, where the second SCS is a smallest SCS in the SCS of the BWP of the first CC;

the second SCS;

a BWP corresponding to the second SCS and the BWP of the second CC; and the second SCS and the SCS of the BWP of the second CC.

To better understand this application, the following provides descriptions in detail by using some specific examples:

I. The terminal determines, based on the target information specified by the protocol or indicated by the network-side device, beam information used for the first CSI-RS and/or the first SRS.

Optionally, the network-side device may indicate the target information by using RRC or MAC CE signaling. The first CSI-RS may include only an aperiodic CSI-RS, and the first SRS may include only an aperiodic SRS.

The target information may be used to indicate that all CSI-RS and/or SRS resources use the common beam. For example, it is used when a value of one of the parameters is enable, and it is not used when a value of one of the parameters is disable or default.

Optionally, the target information may be in the configuration information for the CSI-RS resource set or the CSI-RS resource, and is used for indicating whether the CSI-RS resource set or the CSI-RS resource uses the common beam.

Optionally, the target information may be in the configuration information for the SRS resource set or the SRS resource, and is used for indicating whether the SRS resource set or the SRS resource uses the common beam.

Optionally, the target information may be used to indicate whether SRS resource sets of different usages use the common beam.

Optionally, the beam information indicated by the network-side device for each CSI-RS resource and/or SRS resource may be default when the target information indicates that the CSI-RS and/or SRS uses the common beam.

In this embodiment of this application, the common beam may be further understood as: a DL TCI state for a terminal-dedicated physical downlink shared channel PDSCH and for all or part of dedicated control resource sets (UE-dedicated reception on PDSCH and for UE-dedicated reception on all or subset of CORESETs), and/or an UL TCI state for a dynamic-grant or configured-grant based physical uplink shared channel PUSCH and for all dedicated physical uplink control channels PUCCHs (dynamic-grant/configured-grant based PUSCH and all of the dedicated PUCCH resources).

II. When a scheduling offset between a first PDCCH for triggering an aperiodic first CSI-RS and the first CSI-RS is less than a preset threshold, the beam information for the aperiodic CSI-RS may be determined according to the following behavior:

performing a first operation behavior if a first preset condition is satisfied, where the first preset condition includes: if enableDefaultTCI-StatePercoResetPoolidex is configured for the UE and a higher layer parameter PDCCH-Config is configured for the UE, ControlResourceSet in the parameter contains two different CoreSetPoolidex values. The first operation behavior includes:

1. If the downlink signal on the same symbol as the first CSI-RS is a PDSCH, a second PDCCH for scheduling the PDSCH is associated with a same CORESETPoolIndex as the first PDCCH for triggering the first CSI-RS, and the time domain offset value between the second PDCCH for scheduling the PDSCH and the PDSCH is greater than or equal to a threshold timeDurationForQCL, the TCI state used by the first CSI-RS satisfies at least one of the following:

the first CSI-RS uses a same R17 TCI state as the PDSCH, where the R17 TCI state includes a joint TCI state and a separate TCI state;

the first CSI-RS uses a R17 TCI state indicated by the network and used for a terminal-dedicated (UE-dedicated) channel;

the first CSI-RS uses a TCI state that is indicated by the network-side device for the PDSCH and that is different from that used for the UE-dedicated channel; and the first CSI-RS uses a TCI state that is indicated by the network-side device for a second PDCCH for scheduling the PDSCH and that is different from that used for the UE-dedicated channel.

Optionally, the second PDCCH for scheduling the PDSCH is on a non-UE-dedicated control resource set (non-UE-dedicated CORESET).

2. If the downlink signal on the same symbol as the first CSI-RS is an aperiodic second CSI-RS, the second PDCCH for triggering the second CSI-RS is associated with a same CORESETPoolIndex as the first PDCCH for triggering the first CSI-RS, and condition A is satisfied, then the TCI state used by the first CSI-RS satisfies at least one of the following:

the first CSI-RS uses same beam information as the second CSI-RS;

the first CSI-RS uses an R17 TCI state indicated by the network-side device for the UE-dedicated channel;

the first CSI-RS uses a TCI state that is indicated by the network-side device for the second CSI-RS and that is different from that used for the UE-dedicated channel; and the first CSI-RS uses a TCI state that is indicated by the network-side device for the second PDCCH for triggering the second CSI-RS and that is different from that used for the UE-dedicated channel.

Further, the second PDCCH for triggering the second CSI-RS is on a non-UE-dedicated CORESET.

Optionally, the foregoing condition A includes any one of the following:

when the UE has reported one of the values {14,28,48}, the network-side device does not configure enableBeamSwitchTiming, and an offset between the second CSI-RS and the corresponding second PDCCH is greater than or equal to the UE-reported threshold beamSwitchingTiming; and when the UE has reported one of the values {224,336}, the network configures enableBeamSwitchTiming, and the offset between the second CSI-RS and the corresponding second PDCCH is greater than or equal to 48.

3. If the downlink signal on the same symbol as the first CSI-RS is a periodic or semi-persistent second CSI-RS, the first CSI-RS uses a same TCI state as the second CSI-RS.

Optionally, the TCI state of the second CSI-RS is different from the R17 TCI state indicated by the network-side device for the UE-dedicated channel.

4. If there is no other downlink signal on the same symbol as the first CSI-RS, the first CSI-RS uses the beam information for the first CORESET, and the first control resource set satisfies at least one of the following:

a control resource set pool index for the first control resource set is the same as a control resource set pool index associated with the first PDCCH;

an index of the first control resource set is a smallest control resource set index;

the first control resource set is located in a target slot closest to the first CSI-RS, and in the target slot, a control resource set pool index for at least one control resource set is the same as the control resource set pool index associated with the first PDCCH; and the first control resource set is located in an active bandwidth part BWP of a serving cell.

Optionally, if the first CORESET is not a non-UE-dedicated CORESET, both the first CSI-RS and the first CORESET use the same R17 TCI state indicated by the network-side device for the UE-dedicated channel.

Optionally, if the first CORESET is a non-UE-dedicated CORESET and the network indicates an intra-cell R17 TCI state, the first CSI-RS uses an R17 TCI state indicated by the network for the UE-dedicated channel, or the first CSI-RS uses a TCI state that is indicated by the network and that is different from that of the UE-dedicated channel.

Optionally, if the first CORESET is a non-UE-dedicated CORESET and the network indicates an inter-cell R17 TCI state, the first CSI-RS satisfies at least one of the following:

the first CSI-RS uses a TCI state that is indicated by the network-side device and that is different from that of the UE-dedicated channel;

the first CSI-RS uses a TCI state associated with a serving cell (Scell) PCI and indicated by the network-side device;

the first CSI-RS uses an R17 TCI state indicated by the network-side device for the UE-dedicated channel;

the first CSI-RS uses a TCI state associated with a non-serving cell PCI and indicated by the network-side device; and the first CSI-RS uses a TCI state with a default PCI indicated by the network-side device.

In a case that the second preset condition is satisfied, or the second preset condition is satisfied and the first preset condition is not satisfied, a second operation behavior is performed; where the second preset condition includes: if enableTwoDefaultTCI-States is configured for the UE and at least one TCI code point is mapped to two TCI States. The second operation behavior includes:

1. If the downlink signal on the same symbol as the first CSI-RS is a PDSCH, and an offset between the second PDCCH for scheduling the PDSCH and the PDSCH is greater than or equal to a threshold timeDurationForQCL, the TCI state used by the first CSI-RS satisfies at least one of the following:

the first CSI-RS uses a same R17 TCI state as the PDSCH;

the first CSI-RS uses an R17 TCI state indicated by the network for the UE-dedicated channel;

the first CSI-RS uses a TCI state that is indicated by the network-side device for the PDSCH and that is different from that used for the UE-dedicated channel; and the first CSI-RS uses a TCI state that is indicated by the network-side device for a second PDCCH for scheduling the PDSCH and that is different from that used for the UE-dedicated channel.

Optionally, the second PDCCH for scheduling the PDSCH is on a non-UE-dedicated CORESET.

Optionally, if the network-side device indicates a plurality of TCI states, the first CSI-RS uses a preset (for example, the 1st) TCI state in the plurality of TCI states; where the plurality of TCI states may correspond to different CORESETPoolIndexes, different channel groups, terminal panels, and the like.

2. If the downlink signal on the same symbol as the first CSI-RS is an aperiod second CSI-RS and condition C is satisfied, the TCI state used by the first CSI-RS satisfies at least one of the following:

the first CSI-RS uses same beam information as the second CSI-RS;

the first CSI-RS uses an R17 TCI state indicated by the network-side device for the UE-dedicated channel;

the first CSI-RS uses a TCI state that is indicated by the network-side device for the second CSI-RS and that is different from that used for the UE-dedicated channel; and the first CSI-RS uses a TCI state that is indicated by the network-side device for the second PDCCH for triggering the second CSI-RS and that is different from that used for the UE-dedicated channel.

Further, the second PDCCH for triggering the second CSI-RS is on a non-UE-dedicated CORESET.

Optionally, the foregoing condition C includes any one of the following:

a scheduling offset for the second CSI-RS is greater than or equal to a UE-reported threshold beamSwitchTiming, where the UE reports one of the values {14,28,48} and enableBeamSwitchTiming is not configured;

the scheduling offset for the second CSI-RS is greater than or equal to 48, where UE-reported beamSwitchTiming-r16 is one of the values {224,336} and enableBeamSwitchTiming is configured.

3. If the downlink signal on the same symbol as the first CSI-RS is a periodic or semi-persistent second CSI-RS, the first CSI-RS uses a same TCI state as the second CSI-RS.

Optionally, the TCI state of the second CSI-RS is different from the R17 TCI state indicated by the network-side device for the UE-dedicated channel.

4. If there is no other downlink signal on the same symbol as the first CSI-RS, the first CSI-RS satisfies at least one of the following:

the first CSI-RS uses an R17 TCI state indicated by the network-side device for the UE-dedicated channel or a preset (for example, the 1st) TCI state in the plurality of TCI states, the plurality of TCI states is a plurality of R17 TCI states for the UE-dedicated channel;

the first CSI-RS uses a TCI state most recently indicated by the network-side device, or a preset (for example, the 1st) TCI state in the plurality of TCI states most recently indicated;

the first CSI-RS uses a preset (for example, the 1st) TCI state in TCI states corresponding to the lowest TCI code point in TCI states activated by the network; and the first CSI-RS uses a preset (for example, the 1st) TCI state in a plurality of TCI states that are corresponding to the lowest TCI codepoint in TCI codepoints of a plurality of TCI states among codepoints corresponding to TCI states activated by the network-side device.

Optionally, the plurality of TCI states may correspond to different CORESETPoolIndexes, different channel groups, terminal panels, and the like.

Optionally, the indicated or activated TCI state is in an active BWP of a cell in which the CSI-RS is located.

Optionally, the foregoing scenario of using the activated TCI state may be:

being within a time between activation of the TCI state using a MAC CE by the network-side device and indication of the TCI state using DCI;

an interval between a transmission time of the first CSI-RS and a time of most recently indicating the TCI state by the network exceeds a preset duration; and the network activates the TCI state by using the MAC CE again after the most recent indication of the TCI state by the network.

In a case that the third preset condition is satisfied and neither of the first preset condition and the second preset condition is satisfied, a third operation behavior is performed; where the third preset condition includes: any other DL signal using the TCI state indicated by the network-side device is present in the same symbol as the CSI-RS. The third operation behavior includes:

1. If the downlink signal on the same symbol as the first CSI-RS is a PDSCH, and an offset between the second PDCCH for scheduling the PDSCH and the PDSCH is greater than or equal to a threshold timeDurationForQCL, the TCI state used by the first CSI-RS satisfies at least one of the following:

the first CSI-RS uses a same R17 TCI state as the PDSCH;

the first CSI-RS uses an R17 TCI state indicated by the network for the UE-dedicated channel;

the first CSI-RS uses a TCI state that is indicated by the network-side device for the PDSCH and that is different from that used for the UE-dedicated channel; and the first CSI-RS uses a TCI state that is indicated by the network-side device for a second PDCCH for scheduling the PDSCH and that is different from that used for the UE-dedicated channel.

Optionally, the second PDCCH for scheduling the PDSCH is on a non-UE-dedicated CORESET.

2. If the downlink signal on the same symbol as the first CSI-RS is an aperiod second CSI-RS and condition D is satisfied, the TCI state used by the first CSI-RS satisfies at least one of the following:

the first CSI-RS uses a same R17 TCI state as the second CSI-RS;

the first CSI-RS uses an R17 TCI state indicated by the network for the UE-dedicated channel;

the first CSI-RS uses a TCI state that is indicated by the network-side device for the second CSI-RS and that is different from that used for the UE-dedicated channel; and the first CSI-RS uses a TCI state that is indicated by the network-side device for the second PDCCH for triggering the second CSI-RS and that is different from the TCI state used for the UE-dedicated channel.

Optionally, the second PDCCH for triggering the second CSI-RS is on a non-UE-dedicated CORESET.

Optionally, the foregoing condition D includes any one of the following:

when the UE has reported one of the values {14,28,48}, the network-side device does not configure enableBeamSwitchTiming, and an offset between the second CSI-RS and the corresponding second PDCCH is greater than or equal to the UE-reported threshold beamSwitchingTiming;

trs-Info is configured for a resource set in which the second CSI-RS is located;

the UE has reported one of the values {224,336}, the network-side device configures enableBeamSwitchTiming, a repetition parameter configured for the second CSI-RS is off or the repetition parameter and trs-Info are not configured for the second CSI-RS, and an offset between the second CSI-RS and the corresponding second PDCCH is greater than or equal to 48; and the UE has reported one of the values {224,336}, the network-side device configures enableBeamSwitchTiming, and the repetition parameter configured for the second CSI-RS is on.

3. If the downlink signal on the same symbol as the first CSI-RS is a periodic or semi-persistent second CSI-RS, the first CSI-RS uses a same TCI state as the second CSI-RS.

Optionally, the TCI state of the second CSI-RS is different from the R17 TCI state indicated by the network-side device for the UE-dedicated channel.

In a case that the fourth preset condition is satisfied and none of the first preset condition, the second preset condition, and the third preset condition is satisfied, a fourth operation behavior is performed; where the fourth preset condition includes:

the network-side device configures at least one control resource set for a BWP in which the first CSI-RS is received;

the network-side device configures at least one terminal-dedicated control resource set for a BWP in which the first CSI-RS is received; and the network-side device configures at least one non-terminal-dedicated control resource set for a BWP in which the first CSI-RS is received.

The fourth operation behavior includes: using beam information of a first CORESET for the first CSI-RS, where the first control resource set satisfies at least one of the following:

an index of the first control resource set is a smallest control resource set index;

the first control resource set is located in the target slot closest to the first CSI-RS, and at least one control resource set is present in the target slot; and the first control resource set is located in an active bandwidth part BWP of a serving cell.

Optionally, if the first CORESET is not a non-UE-dedicated CORESET, both the first CSI-RS and the first CORESET use the same R17 TCI state indicated by the network-side device for the UE-dedicated channel.

Optionally, if the first CORESET is a non-UE-dedicated CORESET and the network indicates an intra-cell R17 TCI state, the first CSI-RS uses an R17 TCI state indicated by the network for the UE-dedicated channel, or the first CSI-RS uses a TCI state that is indicated by the network and that is different from that of the UE-dedicated channel.

Optionally, if the first CORESET is a non-UE-dedicated CORESET and the network indicates an inter-cell R17 TCI state, the first CSI-RS satisfies at least one of the following:

the first CSI-RS uses a TCI state that is indicated by the network-side device and that is different from that of the UE-dedicated channel;

the first CSI-RS uses a TCI state associated with a serving cell PCI and indicated by the network-side device;

the first CSI-RS uses an R17 TCI state indicated by the network-side device for the UE-dedicated channel;

the first CSI-RS uses a TCI state associated with a non-serving cell (Scell) PCI and indicated by the network-side device; and the first CSI-RS uses a TCI state with a default PCI indicated by the network-side device;

In a case that the first preset condition, the second preset condition, the third preset condition, and the fourth preset condition are not satisfied, and the fifth preset condition is satisfied, a fifth operation behavior is performed. The fifth preset condition includes: the network-side device configures a first parameter for the terminal, the first parameter being used to indicate starting a default beam used for cross-carrier scheduling. The fifth operation behavior includes: using at least one of the following beam information for the first CSI-RS:

the first CSI-RS uses an R17 TCI state indicated by the network-side device for the UE-dedicated channel, or a preset (for example, the 1st) TCI state in the plurality of TCI states, the plurality of TCI states is a plurality of R17 TCI states for the UE-dedicated channel;

the first CSI-RS uses a TCI state most recently indicated by the network-side device, or a preset (for example, the 1st) TCI state in the plurality of TCI states most recently indicated;

the first CSI-RS uses a preset (for example, the 1st) TCI state in TCI states corresponding to the lowest TCI codepoint in TCI states activated by the network;

the first CSI-RS uses a preset (for example, the 1st) TCI state in a plurality of TCI states that are corresponding to the lowest TCI codepoint in TCI codepoints of a plurality of TCI states among codepoints corresponding to TCI states activated by the network.

Optionally, the plurality of TCI states may correspond to different CORESETPoolIndexes, different channel groups, terminal panels, and the like.

Optionally, the indicated or activated TCI state is in an active BWP of a cell in which the CSI-RS is located.

Optionally, the foregoing scenario of using the activated TCI state may be:

being within a time between activation of the TCI state using a MAC CE by the network-side device and indication of the TCI state using DCI;

an interval between a transmission time of the first CSI-RS and a time of most recently indicating the TCI state by the network exceeds a preset duration; and the network activates the TCI state by using the MAC CE again after the most recent indication of the TCI state by the network.

III. Power control parameter for SRSs

1. For pathloss RSs, at least one of the following is satisfied:

if the SRS uses a common beam, a pathloss RS configured in the TCI state or a pathloss RS associated with the TCI state is used, or a source RS in the TCI state is used (in this case, the source RS needs to be a DL periodic RS); or if the SRS does not use the common beam, the pathloss RS is determined in accordance with the existing related technologies.

2. For power control parameters other than the pathloss RS, including P0, alpha, closed loop index, or the like, if the SRS uses the common beam, the other power control parameters satisfy at least one of the following:

the other power control parameters are associated with the TCI state; and if the other power control parameters are not associated with the TCI state, a default value in candidate values of the other power control parameters configured by the network-side device for the SRS is used, or a value indicated by the network-side device from candidate values configured for the other power control parameters is used.

Optionally, the candidate value may be configured in at least one of BWP configuration information, SRS configuration information, SRS resource set configuration information, and SRS resource configuration information.

Optionally, if the SRS does not use the common beam, other power control parameters are determined in accordance with existing related technologies.

4. The network-side device configures parameter information of a BAT (or beam validation time) for the common beam information. The parameter information of the BAT may be Y ms/slots/symbols.

Optionally, a group of Y values configured by the network-side device is in at least one of the following configuration information: band configuration information, configuration information of a group of CCs (CC list), CC configuration information, BWP configuration information, and PUCCH configuration information.

Optionally, the group of Y values satisfies at least one of the following:

a Y value for each subcarrier spacing SCS;

a Y-value for a first SCS, where the first SCS is an SCS of a BWP of a cell in which a PUCCH carrying an acknowledgement ACK of signaling for indicating the target TCI state by the network-side device is located;

a Y value for each BWP in a set of component carriers CCs;

a Y value for each BWP in CCs within a frequency band; and one Y value shared by a plurality of first objects; where the first object is a target BWP, a subcarrier spacing SCS of the target BWP, a target CC, a CC list to which the target CC belongs, or a frequency band to which the target CC belongs; where the target BWP is a BWP in which a channel for applying the target TCI state is located, and the target CC is a CC in which a channel for applying the target TCI state is located.

Optionally, the network-side device indicates a common TCI state ID, for determining common beam information for a group of CCs.

Optionally, the behavior of determining the BAT includes:

determining a BAT for each BWP of each CC based on a BWP (or SCS) of a CC to which the common beam information is applied and a BWP (or SCS) of a CC in which ACK information for the common beam information is located;

determining a BWP having the smallest SCS in BWPs of CCs to which the common beam information is applied, and determining a BAT of each BWP of each CC based on the BWP (or SCS); and determining a BWP having the smallest SCS in BWPs of CCs to which the common beam information is applied, and determining a BAT of each BWP of each CC based on the BWP (or SCS) and a BWP (or SCS) of a CC in which ACK information for the common beam information is located.

For example, configuration information for band1 (or CC list1) includes: {SCS1, Y1}{SCS2, Y2}{SCS3, Y3} . . . . Accordingly, the Y value corresponding to each SCS can be determined, or the Y value corresponding to the smallest SCS can be determined.

Alternatively, configuration information for band1 (or CC list1) includes: {SCS1, Y11, Y12}{SCS2, Y21, Y22}{SCS3, Y31, Y32} . . . . In this case, because an ACK of signaling for indicating the TCI state by the network can be configured on two CCs, the two Y values corresponding to each SCS correspond to two CCs on which the ACK may be configured, respectively, and the Y values can be found based on SCSs of BWPs of cells in which SCSs and ACKs are located.

Figure 3:
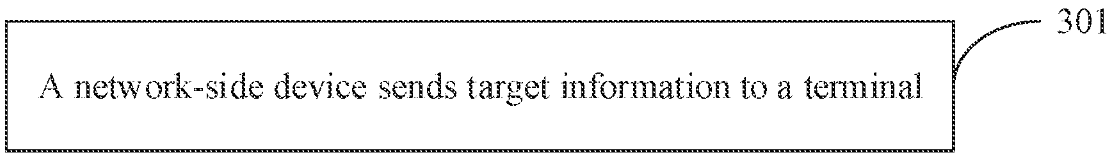
FIG. 3 is a flowchart of another transmission processing method according to an embodiment of this application.

Referring to FIG. 3, FIG. 3 is a flowchart of another transmission processing method according to an embodiment of this application. As shown in FIG. 3, the method includes the following step.

Step 301: A network-side device sends target information to a terminal; where the target information is used to indicate whether a target object uses a target transmission configuration indicator state TCI state.

The target object is at least one of a channel state information reference signal CSI-RS and a sounding reference signal SRS, and the target TCI state includes at least one of the following:

a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

Optionally, the target information satisfies at least one of the following:

the target information is used for indicating whether all of the target objects use the target TCI state;

the target information is used for indicating whether all target objects in a resource set corresponding to the target object uses the target TCI state;

the target information is used for indicating whether a resource corresponding to the target object uses the target TCI state;

the target information is used for indicating whether all target objects in a configuration corresponding to the target object uses the target TCI state; and the target information is used for indicating whether the target objects for different purposes use the target TCI state.

Optionally, the target information is carried in any one of the following configuration information:

configuration information for a resource set of the target object;

configuration information for the target object;

configuration information for a resource of the target object;

configuration information for a cell to which the target object belongs;

configuration information for a bandwidth part BWP to which the target object belongs;

configuration information for a cell group to which the target object belongs; and configuration information for a frequency band to which the target object belongs.

Optionally, in a case that the target object includes an aperiodic first CSI-RS and a target condition is satisfied, a TCI state for the first CSI-RS is a first TCI state, a second TCI state, a third TCI state, or a fourth TCI state; where the target condition includes: a time domain offset between a first PDCCH triggering the first CSI-RS and the first CSI-RS is less than a first preset value.

Optionally, the first TCI state satisfies any one of the following:

the first TCI state is a TCI state used for a first downlink signal, the first downlink signal being transmitted in a same time unit as the first CSI-RS;

the first TCI state is the target TCI state;

the first TCI state is a TCI state indicated by the network-side device for the first downlink signal and the first TCI state is different from the target TCI state; and the first TCI state is a TCI state indicated by the network-side device for a second PDCCH, and the first TCI state is different from the target TCI state, where the second PDCCH is used for triggering or scheduling the first downlink signal.

Optionally, the second PDCCH for scheduling or triggering the first downlink signal is carried on a non-terminal-dedicated control resource set.

Optionally, the first downlink signal is a first PDSCH or is an aperiodic second CSI-RS.

Optionally, in a case that the network-side device indicates a plurality of TCI states, the first TCI state is the N-th TCI state in the plurality of TCI states, N is a second preset value, and the plurality of TCI states satisfy at least one of the following:

the plurality of TCI states are used for a terminal-dedicated physical downlink shared channel PDSCH and for all or part of dedicated control resource sets;

the plurality of TCI states are used for a dynamic-grant or configured-grant based physical uplink shared channel PUSCH and for all dedicated physical uplink control channels PUCCHs;

the plurality of TCI states are used for the first downlink signal; and the plurality of TCI states are used for the second PDCCH.

Optionally, the second TCI state is a TCI state for a periodic or semi-persistent second CSI-RS, the TCI state of the second CSI-RS is a TCI state different from the target TCI state, and the second CSI-RS is transmitted in a same time unit as the first CSI-RS.

Optionally, the third TCI state is a TCI state for a first control resource set, and the first control resource set satisfies at least one of the following:

a control resource set pool index for the first control resource set is the same as a control resource set pool index associated with the first PDCCH;

an index of the first control resource set is a smallest control resource set index;

the first control resource set is located in a target slot closest to the first CSI-RS, and in the target slot, a control resource set pool index for at least one control resource set is the same as the control resource set pool index associated with the first PDCCH;

the first control resource set is located in the target slot closest to the first CSI-RS, and at least one control resource set is present in the target slot; and the first control resource set is located in an active bandwidth part BWP of a serving cell.

Optionally, in a case that the first control resource set is a terminal-dedicated control resource set, the TCI state for the first control resource set is the target TCI state.

Optionally, in a case that the first control resource set is a non-terminal-dedicated control resource set and the network-side device indicates an intra-cell TCI state, the third TCI state satisfies any one of the following:

the third TCI state is the target TCI state; and the third TCI state is different from the target TCI state.

Optionally, in a case that the first control resource set is a non-terminal-dedicated control resource set and the network-side device indicates an inter-cell TCI state, the third TCI state satisfies at least one of the following:

the third TCI state is different from the target TCI state;

the third TCI state is a TCI state associated with a physical cell identifier PCI of the serving cell;

the third TCI state is the target TCI state;

the third TCI state is a TCI state associated with a PCI of a non-serving cell; and the third TCI state is a TCI state for a default PCI.

Optionally, the fourth TCI state satisfies at least one of the following:

the fourth TCI state is the target TCI state;

the fourth TCI state is a preset TCI state in a plurality of TCI states, and the plurality of TCI states is a plurality of target TCI states;

the fourth TCI state is a TCI state most recently indicated by the network-side device;

the fourth TCI state is a preset TCI state in a plurality of TCI states most recently indicated by the network-side device; and the fourth TCI state is a fifth TCI state; where the fifth TCI state is a preset TCI state in L TCI states, the L TCI states are one or more TCI states corresponding to a lowest TCI code point in all TCI states activated by the network-side device, or the L TCI states are a plurality of TCI states corresponding to a lowest target code point in TCI states activated by the network-side device, and the target code point is a TCI code point corresponding to at least two TCI states.

Optionally, the fourth TCI state is a fifth TCI state in a case that the first CSI-RS satisfies any one of the following conditions:

a transmission time of the first CSI-RS is located within a time period between activation of the TCI state by the network-side device and indication of the TCI state;

an interval between the transmission time of the first CSI-RS and a time for most recently indicating the TCI state by the network-side device is greater than or equal to a preset duration; and the network-side device reactivates a TCI state between the time for most recently indicating the TCI state by the network-side device and the transmission time of the first CSI-RS.

Optionally, the plurality of TCI states satisfy at least one of the following:

at least two TCI states correspond to different control resource set pool indexes;

at least two TCI states correspond to different channel groups; and at least two TCI states correspond to different terminal panels.

Optionally, the TCI state for the first CSI-RS is determined according to a target rule, the target rule including at least one of the following:

in a case that a first preset condition is satisfied, a second preset condition is satisfied, or a third preset condition is satisfied and neither the first preset condition nor the second preset condition is satisfied, the TCI state for the first CSI-RS is determined based on a preset rule;

in a case that a fourth preset condition is satisfied and none of the first preset condition, the second preset condition, and the third preset condition is satisfied, the TCI state for the first CSI-RS is the third TCI state; and in a case that the fifth preset condition is satisfied and none of the first preset condition, the second preset condition, the third preset condition, and the fourth preset condition is satisfied, the TCI state for the first CSI-RS is the fourth TCI state.

Optionally, the first preset condition includes: at least two different control resource set pool index values are configured for the terminal and a default beam is started for each control resource set pool index.

Optionally, the second preset condition includes: a mode of enabling at least two default beams is configured for the terminal and at least one TCI code point corresponds to at least two TCI states during activation of the TCI state.

Optionally, the third preset condition includes: a first downlink signal transmitted in a same time unit as the first CSI-RS is present.

Optionally, the fourth preset condition includes any one of the following:

the network-side device configures at least one control resource set for a BWP in which the first CSI-RS is received;

the network-side device configures at least one terminal-dedicated control resource set for a BWP in which the first CSI-RS is received; and the network-side device configures at least one non-terminal-dedicated control resource set for a BWP in which the first CSI-RS is received.

Optionally, the fifth preset condition includes: the network-side device configures a first parameter for the terminal, the first parameter being used to indicate starting a default beam used for cross-carrier scheduling.

Optionally, the preset rule satisfies at least one of the following:

a first downlink signal transmitted at a same time as the first CSI-RS is present and, in a case that a first sub-condition is satisfied, the TCI state for the first CSI-RS is the first TCI state;

in a case that a second sub-condition is satisfied, the TCI state for the first CSI-RS is the second TCI state;

in a case that both the first preset condition is satisfied and the third sub-condition is satisfied, the TCI state for the first CSI-RS is the third TCI state; and in a case that the second preset condition is satisfied and the third sub-condition is satisfied, the TCI state for the first CSI-RS is the fourth TCI state.

Optionally, the first sub-condition includes at least one of the following:

a second PDCCH for scheduling or triggering the first downlink signal is associated with a same control resource set pool index as the first PDCCH;

in a case that the first downlink signal is the first PDSCH, a time domain offset value between a PDCCH for scheduling the first PDSCH and the first PDSCH is greater than or equal to a first preset threshold; and in a case that the first downlink signal is an aperiodic second CSI-RS, a time domain offset between a PDCCH for triggering the second CSI-RS and the second CSI-RS is greater than or equal to a second preset threshold.

Optionally, in a case that the first downlink signal is an aperiodic second CSI-RS, the first sub-condition further includes any one of the following:

the terminal has reported a first value and a second parameter is not configured for the terminal, where the first value is 14, 28, or 48, and the second parameter is used to enable beam switching timing;

the terminal has reported a second value and the second parameter is configured for the terminal, the second value being 224 or 336;

tracking reference signal information trs-Info is configured for the terminal;

the terminal has reported the second value, the second parameter is configured for the terminal, and a repetition parameter configured for the second CSI-RS is off, or neither the repetition parameter nor the trs-Info is configured for the second CSI-RS; and the terminal has reported the second value, the second parameter is configured for the terminal, and the repetition parameter configured for the second CSI-RS is on.

Optionally, the second sub-condition includes: a first downlink signal transmitted in a same time unit as the first CSI-RS is a periodic or semi-persistent second CSI-RS.

Optionally, the third sub-condition includes: a first downlink signal transmitted in a same time unit as the first CSI-RS is absent.

Optionally, in a case that the SRS uses the target TCI state, a power control parameter for the SRS satisfies at least one of the following:

a pathloss reference signal uses a pathloss signal in the target TCI state or a pathloss signal associated with the target TCI state, or uses a source reference signal in the target TCI state, a quasi co-location type of the source reference signal being type D; and a target power control parameter satisfies a sixth preset condition, and the target power control parameter includes at least one power control parameter in power control parameters of the SRS other than the pathloss reference signal; where the sixth preset condition satisfies at least one of the following:

the target power control parameter is associated with the target TCI state; and in a case that the target power control parameter is not associated with the target TCI state, a parameter value of the target power control parameter is a default value in candidate values or is a value indicated by the network-side device from the candidate values.

Optionally, the candidate value is configured by at least one of the following: BWP configuration information, SRS configuration information, SRS resource set configuration information, and SRS resource configuration information.

Optionally, the method further includes:

when the terminal is in a carrier aggregation scenario, sending configuration information to the terminal, where the configuration information is used to configure target parameter information, and the target parameter information is used to indicate a validation time of the target TCI state.

Optionally, the target parameter information is carried in any one of the following configuration information:

configuration information for a frequency band;

configuration information for a component carrier CC list;

configuration information for a CC;

configuration information for a BWP;

configuration information for a cell; and configuration information for a PUCCH.

Optionally, the target parameter information includes at least one Y value, and the at least one Y value including any one of the following:

a Y value for each subcarrier spacing SCS;

a Y-value for a first SCS, where the first SCS is an SCS of a BWP of a cell in which a PUCCH carrying an acknowledgement ACK of signaling for indicating the target TCI state by the network-side device is located;

a Y value for each BWP in a set of component carriers CCs;

a Y value for each BWP in CCs within a frequency band; and one Y value shared by a plurality of first objects; where the first object is a target BWP, a subcarrier spacing SCS of the target BWP, a target CC, a CC list to which the target CC belongs, or a frequency band to which the target CC belongs; where the target BWP is a BWP in which a channel for applying the target TCI state is located, and the target CC is a CC in which a channel for applying the target TCI state is located.

It should be noted that this embodiment is used as an implementation of the network-side device corresponding to the embodiment shown in FIG. 2. For a specific implementation of this embodiment, reference may be made to the related descriptions of the embodiment shown in FIG. 2, and a same beneficial effect is achieved. To avoid repetition, details are not described herein again.

It should be noted that, for the transmission processing method provided by the embodiments of this application, the execution body may be a transmission processing apparatus, or a control module for executing the transmission processing method in the transmission processing apparatus. In the embodiments of this application, the transmission processing method being performed by the transmission processing apparatus is used as an example to describe the transmission processing apparatus provided in the embodiments of this application.

Figure 4:
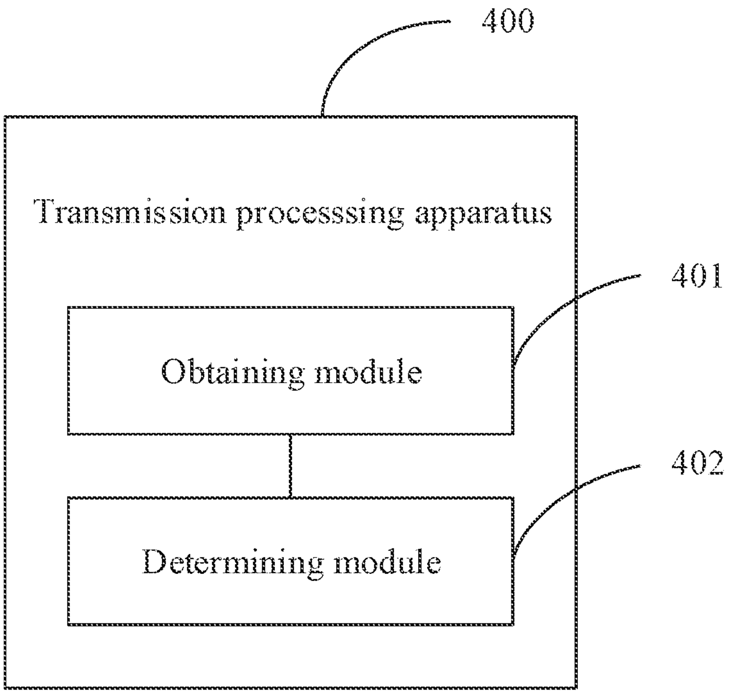
FIG. 4 is a structural diagram of a transmission processing apparatus according to an embodiment of this application.

Referring to FIG. 4, FIG. 4 is a structural diagram of a transmission processing apparatus according to an embodiment of this application. As shown in FIG. 4, the transmission processing apparatus 400 includes:

an obtaining module 401, configured to obtain target information; and a determining module 402, configured to determine, based on the target information, whether a target object uses a target transmission configuration indicator state TCI state; where the target information is specified by a protocol or indicated by a network-side device, the target object is at least one of a channel state information reference signal CSI-RS and a sounding reference signal SRS, and the target TCI state includes at least one of the following:

a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

Optionally, the target information satisfies at least one of the following:

the target information is used for indicating whether all of the target objects use the target TCI state;

the target information is used for indicating whether all target objects in a resource set corresponding to the target object uses the target TCI state;

the target information is used for indicating whether a resource corresponding to the target object uses the target TCI state;

the target information is used for indicating whether all target objects in a configuration corresponding to the target object uses the target TCI state; and the target information is used for indicating whether the target objects for different purposes use the target TCI state.

Optionally, in a case that the target information is indicated by the network-side device, the target information is carried in any one of the following configuration information:

configuration information for a resource set of the target object;

configuration information for the target object;

configuration information for a resource of the target object;

configuration information for a cell to which the target object belongs;

configuration information for a bandwidth part BWP to which the target object belongs;

configuration information for a cell group to which the target object belongs; and configuration information for a frequency band to which the target object belongs.

Optionally, in a case that the target object includes an aperiodic first CSI-RS and a target condition is satisfied, a TCI state for the first CSI-RS is a first TCI state, a second TCI state, a third TCI state, or a fourth TCI state; where the target condition includes: a time domain offset between a first PDCCH triggering the first CSI-RS and the first CSI-RS is less than a first preset value.

Optionally, the first TCI state satisfies any one of the following:

the first TCI state is a TCI state used for a first downlink signal, the first downlink signal being transmitted in a same time unit as the first CSI-RS;

the first TCI state is the target TCI state;

the first TCI state is a TCI state indicated by the network-side device for the first downlink signal and the first TCI state is different from the target TCI state; and the first TCI state is a TCI state indicated by the network-side device for a second PDCCH, and the first TCI state is different from the target TCI state, where the second PDCCH is used for triggering or scheduling the first downlink signal.

Optionally, the second PDCCH for scheduling or triggering the first downlink signal is carried on a non-terminal-dedicated control resource set.

Optionally, the first downlink signal is a first PDSCH or is an aperiodic second CSI-RS.

Optionally, in a case that the network-side device indicates a plurality of TCI states, the first TCI state is the N-th TCI state in the plurality of TCI states, N is a second preset value, and the plurality of TCI states satisfy at least one of the following:

the plurality of TCI states are used for a terminal-dedicated physical downlink shared channel PDSCH and for all or part of dedicated control resource sets;

the plurality of TCI states are used for a dynamic-grant or configured-grant based physical uplink shared channel PUSCH and for all dedicated physical uplink control channels PUCCHs;

the plurality of TCI states are used for the first downlink signal; and the plurality of TCI states are used for the second PDCCH.

Optionally, the second TCI state is a TCI state for a periodic or semi-persistent second CSI-RS, the TCI state of the second CSI-RS is a TCI state different from the target TCI state, and the second CSI-RS is transmitted in a same time unit as the first CSI-RS.

Optionally, the third TCI state is a TCI state for a first control resource set, and the first control resource set satisfies at least one of the following:

a control resource set pool index for the first control resource set is the same as a control resource set pool index associated with the first PDCCH;

an index of the first control resource set is a smallest control resource set index;

the first control resource set is located in a target slot closest to the first CSI-RS, and in the target slot, a control resource set pool index for at least one control resource set is the same as the control resource set pool index associated with the first PDCCH;

the first control resource set is located in the target slot closest to the first CSI-RS, and at least one control resource set is present in the target slot; and the first control resource set is located in an active bandwidth part BWP of a serving cell.

Optionally, in a case that the first control resource set is a terminal-dedicated control resource set, the TCI state for the first control resource set is the target TCI state.

Optionally, in a case that the first control resource set is a non-terminal-dedicated control resource set and the network-side device indicates an intra-cell TCI state, the third TCI state satisfies any one of the following:

the third TCI state is the target TCI state; and the third TCI state is different from the target TCI state.

Optionally, in a case that the first control resource set is a non-terminal-dedicated control resource set and the network-side device indicates an inter-cell TCI state, the third TCI state satisfies at least one of the following:

the third TCI state is different from the target TCI state;

the third TCI state is a TCI state associated with a physical cell identifier PCI of the serving cell;

the third TCI state is the target TCI state;

the third TCI state is a TCI state associated with a PCI of a non-serving cell; and the third TCI state is a TCI state for a default PCI.

Optionally, the fourth TCI state satisfies at least one of the following:

the fourth TCI state is the target TCI state;

the fourth TCI state is a preset TCI state in a plurality of TCI states, and the plurality of TCI states is a plurality of target TCI states;

the fourth TCI state is a TCI state most recently indicated by the network-side device;

the fourth TCI state is a preset TCI state in a plurality of TCI states most recently indicated by the network-side device; and the fourth TCI state is a fifth TCI state; where the fifth TCI state is a preset TCI state in L TCI states, the L TCI states are one or more TCI states corresponding to a lowest TCI code point in all TCI states activated by the network-side device, or the L TCI states are a plurality of TCI states corresponding to a lowest target code point in TCI states activated by the network-side device, and the target code point is a TCI code point corresponding to at least two TCI states.

Optionally, the fourth TCI state is a fifth TCI state in a case that the first CSI-RS satisfies any one of the following conditions:

a transmission time of the first CSI-RS is located within a time period between activation of the TCI state by the network-side device and indication of the TCI state;

an interval between the transmission time of the first CSI-RS and a time for most recently indicating the TCI state by the network-side device is greater than or equal to a preset duration; and the network-side device reactivates a TCI state between the time for most recently indicating the TCI state by the network-side device and the transmission time of the first CSI-RS.

Optionally, the plurality of TCI states satisfy at least one of the following:

at least two TCI states correspond to different control resource set pool indexes;

at least two TCI states correspond to different channel groups; and at least two TCI states correspond to different terminal panels.

Optionally, the TCI state for the first CSI-RS is determined according to a target rule, the target rule including at least one of the following:

in a case that a first preset condition is satisfied, a second preset condition is satisfied, or a third preset condition is satisfied and neither the first preset condition nor the second preset condition is satisfied, the TCI state for the first CSI-RS is determined based on a preset rule;

in a case that a fourth preset condition is satisfied and none of the first preset condition, the second preset condition, and the third preset condition is satisfied, the TCI state for the first CSI-RS is the third TCI state; and in a case that the fifth preset condition is satisfied and none of the first preset condition, the second preset condition, the third preset condition, and the fourth preset condition is satisfied, the TCI state for the first CSI-RS is the fourth TCI state.

Optionally, the first preset condition includes: at least two different control resource set pool index values are configured for the terminal and a default beam is started for each control resource set pool index.

Optionally, the second preset condition includes: a mode of enabling at least two default beams is configured for the terminal and at least one TCI code point corresponds to at least two TCI states during activation of the TCI state.

Optionally, the third preset condition includes: a first downlink signal transmitted in a same time unit as the first CSI-RS is present.

Optionally, the fourth preset condition includes any one of the following:

the network-side device configures at least one control resource set for a BWP in which the first CSI-RS is received;

the network-side device configures at least one terminal-dedicated control resource set for a BWP in which the first CSI-RS is received; and the network-side device configures at least one non-terminal-dedicated control resource set for a BWP in which the first CSI-RS is received.

Optionally, the fifth preset condition includes: the network-side device configures a first parameter for the terminal, the first parameter being used to indicate starting a default beam used for cross-carrier scheduling.

Optionally, the preset rule satisfies at least one of the following:

a first downlink signal transmitted at a same time as the first CSI-RS is present and, in a case that a first sub-condition is satisfied, the TCI state for the first CSI-RS is the first TCI state;

in a case that a second sub-condition is satisfied, the TCI state for the first CSI-RS is the second TCI state;

in a case that both the first preset condition is satisfied and the third sub-condition is satisfied, the TCI state for the first CSI-RS is the third TCI state; and in a case that the second preset condition is satisfied and the third sub-condition is satisfied, the TCI state for the first CSI-RS is the fourth TCI state.

Optionally, the first sub-condition includes at least one of the following:

a second PDCCH for scheduling or triggering the first downlink signal is associated with a same control resource set pool index as the first PDCCH;

in a case that the first downlink signal is the first PDSCH, a time domain offset value between a PDCCH for scheduling the first PDSCH and the first PDSCH is greater than or equal to a first preset threshold; and in a case that the first downlink signal is an aperiodic second CSI-RS, a time domain offset between a PDCCH for triggering the second CSI-RS and the second CSI-RS is greater than or equal to a second preset threshold.

Optionally, in a case that the first downlink signal is an aperiodic second CSI-RS, the first sub-condition further includes any one of the following:

the terminal has reported a first value and a second parameter is not configured for the terminal, where the first value is 14, 28, or 48, and the second parameter is used to enable beam switching timing;

the terminal has reported a second value and the second parameter is configured for the terminal, the second value being 224 or 336;

tracking reference signal information trs-Info is configured for the terminal;

the terminal has reported the second value, the second parameter is configured for the terminal, and a repetition parameter configured for the second CSI-RS is off, or neither the repetition parameter nor the trs-Info is configured for the second CSI-RS; and the terminal has reported the second value, the second parameter is configured for the terminal, and the repetition parameter configured for the second CSI-RS is on.

Optionally, the second sub-condition includes: a first downlink signal transmitted in a same time unit as the first CSI-RS is a periodic or semi-persistent second CSI-RS.

Optionally, the third sub-condition includes: a first downlink signal transmitted in a same time unit as the first CSI-RS is absent.

Optionally, in a case that the SRS uses the target TCI state, a power control parameter for the SRS satisfies at least one of the following:

a pathloss reference signal uses a pathloss signal in the target TCI state or a pathloss signal associated with the target TCI state, or uses a source reference signal in the target TCI state, a quasi co-location type of the source reference signal being type D; and a target power control parameter satisfies a sixth preset condition, and the target power control parameter includes at least one power control parameter in power control parameters of the SRS other than the pathloss reference signal; where the sixth preset condition satisfies at least one of the following:

the target power control parameter is associated with the target TCI state; and in a case that the target power control parameter is not associated with the target TCI state, a parameter value of the target power control parameter is a default value in candidate values or is a value indicated by the network-side device from the candidate values.

Optionally, the candidate value is configured by at least one of the following: BWP configuration information, SRS configuration information, SRS resource set configuration information, and SRS resource configuration information.

Optionally, the transmission processing apparatus 400 further includes:

a receiving module, configured to: when the terminal is in a carrier aggregation scenario, receive configuration information from the network-side device, where the configuration information is used to configure target parameter information, and the target parameter information is used to indicate a validation time of the target TCI state.

Optionally, the target parameter information is carried in any one of the following configuration information:

configuration information for a frequency band;

configuration information for a component carrier CC list;

configuration information for a CC;

configuration information for a BWP;

configuration information for a cell; and configuration information for a PUCCH.

Optionally, the target parameter information includes at least one Y value, and the at least one Y value including any one of the following:

a Y value for each subcarrier spacing SCS;

a Y-value for a first SCS, where the first SCS is an SCS of a BWP of a cell in which a PUCCH carrying an acknowledgement ACK of signaling for indicating the target TCI state by the network-side device is located;

a Y value for each BWP in a set of component carriers CCs;

a Y value for each BWP in CCs within a frequency band; and one Y value shared by a plurality of first objects; where the first object is a target BWP, a subcarrier spacing SCS of the target BWP, a target CC, a CC list to which the target CC belongs, or a frequency band to which the target CC belongs; where the target BWP is a BWP in which a channel for applying the target TCI state is located, and the target CC is a CC in which a channel for applying the target TCI state is located.

Optionally, the determining module is further configured to: determine a validation time for each BWP in each CC based on a second object; where the second object includes any one of the following:

a BWP of a first CC, where the first CC is a CC in which a channel applying the target TCI state is located;

an SCS of the BWP of the first CC;

the BWP of the first CC and a BWP of the second CC, where the second CC is a CC in which an ACK of signaling for indicating the target TCI state by the network-side device is located;

the SCS of the BWP of the first CC and an SCS of the BWP of the second CC;

a BWP corresponding to a second SCS, where the second SCS is a smallest SCS in the SCS of the BWP of the first CC;

the second SCS;

a BWP corresponding to the second SCS and the BWP of the second CC; and the second SCS and the SCS of the BWP of the second CC.

The transmission processing apparatus provided in this embodiment of this application is capable of implementing the processes that are implemented by the method embodiments in FIG. 2. To avoid repetition, details are not described herein again.

Figure 5:
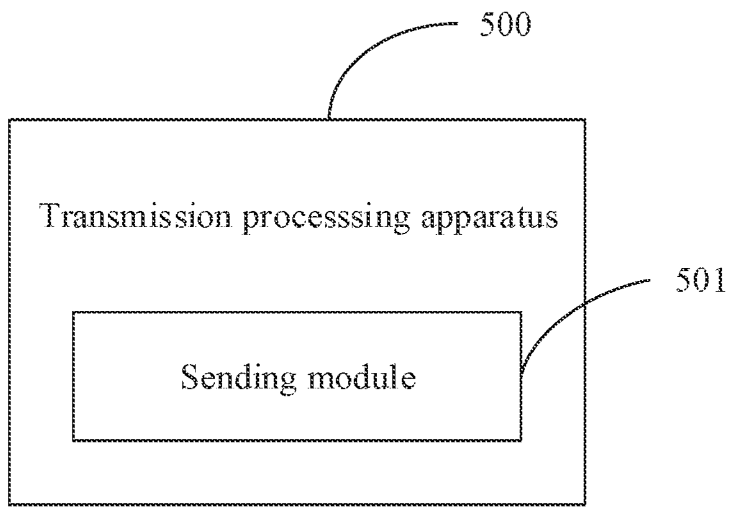
FIG. 5 is a structural diagram of another transmission processing apparatus according to an embodiment of this application.

Referring to FIG. 5, FIG. 5 is a structural diagram of a transmission processing apparatus according to an embodiment of this application. As shown in FIG. 5, the transmission processing apparatus 500 includes:

a sending module 501, configured to send target information to a terminal; where the target information is used to indicate whether a target object uses a target transmission configuration indicator state TCI state; where the target object is at least one of a channel state information reference signal CSI-RS and a sounding reference signal SRS, and the target TCI state includes at least one of the following:

a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

Optionally, the target information satisfies at least one of the following:

the target information is used for indicating whether all of the target objects use the target TCI state;

the target information is used for indicating whether all target objects in a resource set corresponding to the target object uses the target TCI state;

the target information is used for indicating whether a resource corresponding to the target object uses the target TCI state;

the target information is used for indicating whether all target objects in a configuration corresponding to the target object uses the target TCI state; and the target information is used for indicating whether the target objects for different purposes use the target TCI state.

Optionally, the target information is carried in any one of the following configuration information:

configuration information for a resource set of the target object;

configuration information for the target object;

configuration information for a resource of the target object;

configuration information for a cell to which the target object belongs;

configuration information for a bandwidth part BWP to which the target object belongs;

configuration information for a cell group to which the target object belongs; and configuration information for a frequency band to which the target object belongs.

Optionally, in a case that the target object includes an aperiodic first CSI-RS and a target condition is satisfied, a TCI state for the first CSI-RS is a first TCI state, a second TCI state, a third TCI state, or a fourth TCI state; where the target condition includes: a time domain offset between a first PDCCH triggering the first CSI-RS and the first CSI-RS is less than a first preset value.

Optionally, the first TCI state satisfies any one of the following:

the first TCI state is a TCI state used for a first downlink signal, the first downlink signal being transmitted in a same time unit as the first CSI-RS;

the first TCI state is the target TCI state;

the first TCI state is a TCI state indicated by the network-side device for the first downlink signal and the first TCI state is different from the target TCI state; and the first TCI state is a TCI state indicated by the network-side device for a second PDCCH, and the first TCI state is different from the target TCI state, where the second PDCCH is used for triggering or scheduling the first downlink signal.

Optionally, the second PDCCH for scheduling or triggering the first downlink signal is carried on a non-terminal-dedicated control resource set.

Optionally, the first downlink signal is a first PDSCH or is an aperiodic second CSI-RS.

Optionally, in a case that the network-side device indicates a plurality of TCI states, the first TCI state is the N-th TCI state in the plurality of TCI states, N is a second preset value, and the plurality of TCI states satisfy at least one of the following:

the plurality of TCI states are used for a terminal-dedicated physical downlink shared channel PDSCH and for all or part of dedicated control resource sets;

the plurality of TCI states are used for a dynamic-grant or configured-grant based physical uplink shared channel PUSCH and for all dedicated physical uplink control channels PUCCHs;

the plurality of TCI states are used for the first downlink signal; and the plurality of TCI states are used for the second PDCCH.

Optionally, the second TCI state is a TCI state for a periodic or semi-persistent second CSI-RS, the TCI state of the second CSI-RS is a TCI state different from the target TCI state, and the second CSI-RS is transmitted in a same time unit as the first CSI-RS.

Optionally, the third TCI state is a TCI state for a first control resource set, and the first control resource set satisfies at least one of the following:

a control resource set pool index for the first control resource set is the same as a control resource set pool index associated with the first PDCCH;

an index of the first control resource set is a smallest control resource set index;

the first control resource set is located in a target slot closest to the first CSI-RS, and in the target slot, a control resource set pool index for at least one control resource set is the same as the control resource set pool index associated with the first PDCCH;

the first control resource set is located in the target slot closest to the first CSI-RS, and at least one control resource set is present in the target slot; and the first control resource set is located in an active bandwidth part BWP of a serving cell.

Optionally, in a case that the first control resource set is a terminal-dedicated control resource set, the TCI state for the first control resource set is the target TCI state.

Optionally, in a case that the first control resource set is a non-terminal-dedicated control resource set and the network-side device indicates an intra-cell TCI state, the third TCI state satisfies any one of the following:

the third TCI state is the target TCI state; and the third TCI state is different from the target TCI state.

Optionally, in a case that the first control resource set is a non-terminal-dedicated control resource set and the network-side device indicates an inter-cell TCI state, the third TCI state satisfies at least one of the following:

the third TCI state is different from the target TCI state;

the third TCI state is a TCI state associated with a physical cell identifier PCI of the serving cell;

the third TCI state is the target TCI state;

the third TCI state is a TCI state associated with a PCI of a non-serving cell; and the third TCI state is a TCI state for a default PCI.

Optionally, the fourth TCI state satisfies at least one of the following:

the fourth TCI state is the target TCI state;

the fourth TCI state is a preset TCI state in a plurality of TCI states, and the plurality of TCI states is a plurality of target TCI states;

the fourth TCI state is a TCI state most recently indicated by the network-side device;

the fourth TCI state is a preset TCI state in a plurality of TCI states most recently indicated by the network-side device; and the fourth TCI state is a fifth TCI state; where the fifth TCI state is a preset TCI state in L TCI states, the L TCI states are one or more TCI states corresponding to a lowest TCI code point in all TCI states activated by the network-side device, or the L TCI states are a plurality of TCI states corresponding to a lowest target code point in TCI states activated by the network-side device, and the target code point is a TCI code point corresponding to at least two TCI states.

Optionally, the fourth TCI state is a fifth TCI state in a case that the first CSI-RS satisfies any one of the following conditions:

a transmission time of the first CSI-RS is located within a time period between activation of the TCI state by the network-side device and indication of the TCI state;

an interval between the transmission time of the first CSI-RS and a time for most recently indicating the TCI state by the network-side device is greater than or equal to a preset duration; and the network-side device reactivates a TCI state between the time for most recently indicating the TCI state by the network-side device and the transmission time of the first CSI-RS.

Optionally, the plurality of TCI states satisfy at least one of the following:

at least two TCI states correspond to different control resource set pool indexes;

at least two TCI states correspond to different channel groups; and at least two TCI states correspond to different terminal panels.

Optionally, the TCI state for the first CSI-RS is determined according to a target rule, the target rule including at least one of the following:

in a case that a first preset condition is satisfied, a second preset condition is satisfied, or a third preset condition is satisfied and neither the first preset condition nor the second preset condition is satisfied, the TCI state for the first CSI-RS is determined based on a preset rule;

in a case that a fourth preset condition is satisfied and none of the first preset condition, the second preset condition, and the third preset condition is satisfied, the TCI state for the first CSI-RS is the third TCI state; and in a case that the fifth preset condition is satisfied and none of the first preset condition, the second preset condition, the third preset condition, and the fourth preset condition is satisfied, the TCI state for the first CSI-RS is the fourth TCI state.

Optionally, the first preset condition includes: at least two different control resource set pool index values are configured for the terminal and a default beam is started for each control resource set pool index.

Optionally, the second preset condition includes: a mode of enabling at least two default beams is configured for the terminal and at least one TCI code point corresponds to at least two TCI states during activation of the TCI state.

Optionally, the third preset condition includes: a first downlink signal transmitted in a same time unit as the first CSI-RS is present.

Optionally, the fourth preset condition includes any one of the following:

the network-side device configures at least one control resource set for a BWP in which the first CSI-RS is received;

the network-side device configures at least one terminal-dedicated control resource set for a BWP in which the first CSI-RS is received; and the network-side device configures at least one non-terminal-dedicated control resource set for a BWP in which the first CSI-RS is received.

Optionally, the fifth preset condition includes: the network-side device configures a first parameter for the terminal, the first parameter being used to indicate starting a default beam used for cross-carrier scheduling.

Optionally, the preset rule satisfies at least one of the following:

a first downlink signal transmitted at a same time as the first CSI-RS is present and, in a case that a first sub-condition is satisfied, the TCI state for the first CSI-RS is the first TCI state;

in a case that a second sub-condition is satisfied, the TCI state for the first CSI-RS is the second TCI state;

in a case that both the first preset condition is satisfied and the third sub-condition is satisfied, the TCI state for the first CSI-RS is the third TCI state; and in a case that the second preset condition is satisfied and the third sub-condition is satisfied, the TCI state for the first CSI-RS is the fourth TCI state.

Optionally, the first sub-condition includes at least one of the following:

a second PDCCH for scheduling or triggering the first downlink signal is associated with a same control resource set pool index as the first PDCCH;

in a case that the first downlink signal is the first PDSCH, a time domain offset value between a PDCCH for scheduling the first PDSCH and the first PDSCH is greater than or equal to a first preset threshold; and in a case that the first downlink signal is an aperiodic second CSI-RS, a time domain offset between a PDCCH for triggering the second CSI-RS and the second CSI-RS is greater than or equal to a second preset threshold.

Optionally, in a case that the first downlink signal is an aperiodic second CSI-RS, the first sub-condition further includes any one of the following:

the terminal has reported a first value and a second parameter is not configured for the terminal, where the first value is 14, 28, or 48, and the second parameter is used to enable beam switching timing;

the terminal has reported a second value and the second parameter is configured for the terminal, the second value being 224 or 336;

tracking reference signal information trs-Info is configured for the terminal;

the terminal has reported the second value, the second parameter is configured for the terminal, and a repetition parameter configured for the second CSI-RS is off, or neither the repetition parameter nor the trs-Info is configured for the second CSI-RS; and the terminal has reported the second value, the second parameter is configured for the terminal, and the repetition parameter configured for the second CSI-RS is on.

Optionally, the second sub-condition includes: a first downlink signal transmitted in a same time unit as the first CSI-RS is a periodic or semi-persistent second CSI-RS.

Optionally, the third sub-condition includes: a first downlink signal transmitted in a same time unit as the first CSI-RS is absent.

Optionally, in a case that the SRS uses the target TCI state, a power control parameter for the SRS satisfies at least one of the following:

a pathloss reference signal uses a pathloss signal in the target TCI state or a pathloss signal associated with the target TCI state, or uses a source reference signal in the target TCI state, a quasi co-location type of the source reference signal being type D; and a target power control parameter satisfies a sixth preset condition, and the target power control parameter includes at least one power control parameter in power control parameters of the SRS other than the pathloss reference signal; where the sixth preset condition satisfies at least one of the following:

the target power control parameter is associated with the target TCI state; and in a case that the target power control parameter is not associated with the target TCI state, a parameter value of the target power control parameter is a default value in candidate values or is a value indicated by the network-side device from the candidate values.

Optionally, the candidate value is configured by at least one of the following: BWP configuration information, SRS configuration information, SRS resource set configuration information, and SRS resource configuration information.

Optionally, the sending module is further configured to: when the terminal is in a carrier aggregation scenario, send configuration information to the terminal, where the configuration information is used to configure target parameter information, and the target parameter information is used to indicate a validation time of the target TCI state.

Optionally, the target parameter information is carried in any one of the following configuration information:

configuration information for a frequency band;

configuration information for a component carrier CC list;

configuration information for a CC;

configuration information for a BWP;

configuration information for a cell; and configuration information for a PUCCH.

Optionally, the target parameter information includes at least one Y value, and the at least one Y value including any one of the following:

a Y value for each subcarrier spacing SCS;

a Y-value for a first SCS, where the first SCS is an SCS of a BWP of a cell in which a PUCCH carrying an acknowledgement ACK of signaling for indicating the target TCI state by the network-side device is located;

a Y value for each BWP in a set of component carriers CCs;

a Y value for each BWP in CCs within a frequency band; and one Y value shared by a plurality of first objects; where the first object is a target BWP, a subcarrier spacing SCS of the target BWP, a target CC, a CC list to which the target CC belongs, or a frequency band to which the target CC belongs; where the target BWP is a BWP in which a channel for applying the target TCI state is located, and the target CC is a CC in which a channel for applying the target TCI state is located.

The transmission processing apparatus provided in this embodiment of this application is capable of implementing the processes that are implemented by the method embodiments in FIG. 3. To avoid repetition, details are not described herein again.

The transmission processing apparatus in this embodiment of this application may be an apparatus, or an apparatus or electric device having an operating system, or may be a component, an integrated circuit, or a chip in the terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The transmission processing apparatus provided in this embodiment of this application can implement the processes implemented in the method embodiment in FIG. 2 and FIG. 3, with the same technical effects achieved. To avoid repetition, details are not described herein again.

Figure 6:
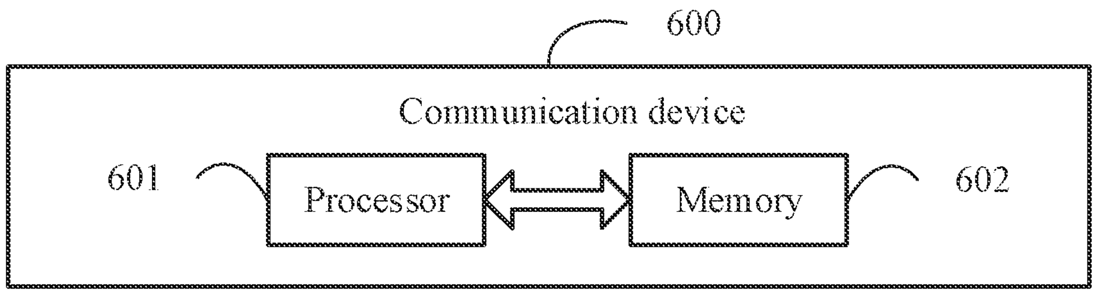
FIG. 6 is a structural diagram of a communication device according to an embodiment of this application.

Optionally, as shown in FIG. 6, an embodiment of this application further provides a communication device 600, including a processor 601, a memory 602, and a program or instructions stored in the memory 602 and capable of running on the processor 601. For example, when the communication device 600 is a terminal and when the program or instructions are executed by the processor 601, the processes of the foregoing embodiment of the transmission processing method are implemented, with the same technical effects achieved. When the communication device 600 is a network-side device and when the program or instructions are executed by the processor 601, the processes of the foregoing embodiment of the transmission processing method are implemented, with the same technical effects achieved. To avoid repetition, details are not described herein again.

An embodiment of this application further provides a terminal including a processor and a communication interface, and the processor is configured to obtain target information, and determine, based on the target information, whether a target object uses a target transmission configuration indicator state TCI state; where the target information is specified by a protocol or indicated by a network-side device, the target object is at least one of a channel state information reference signal CSI-RS and a sounding reference signal SRS, and the target TCI state includes at least one of the following:

a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

Figure 7:
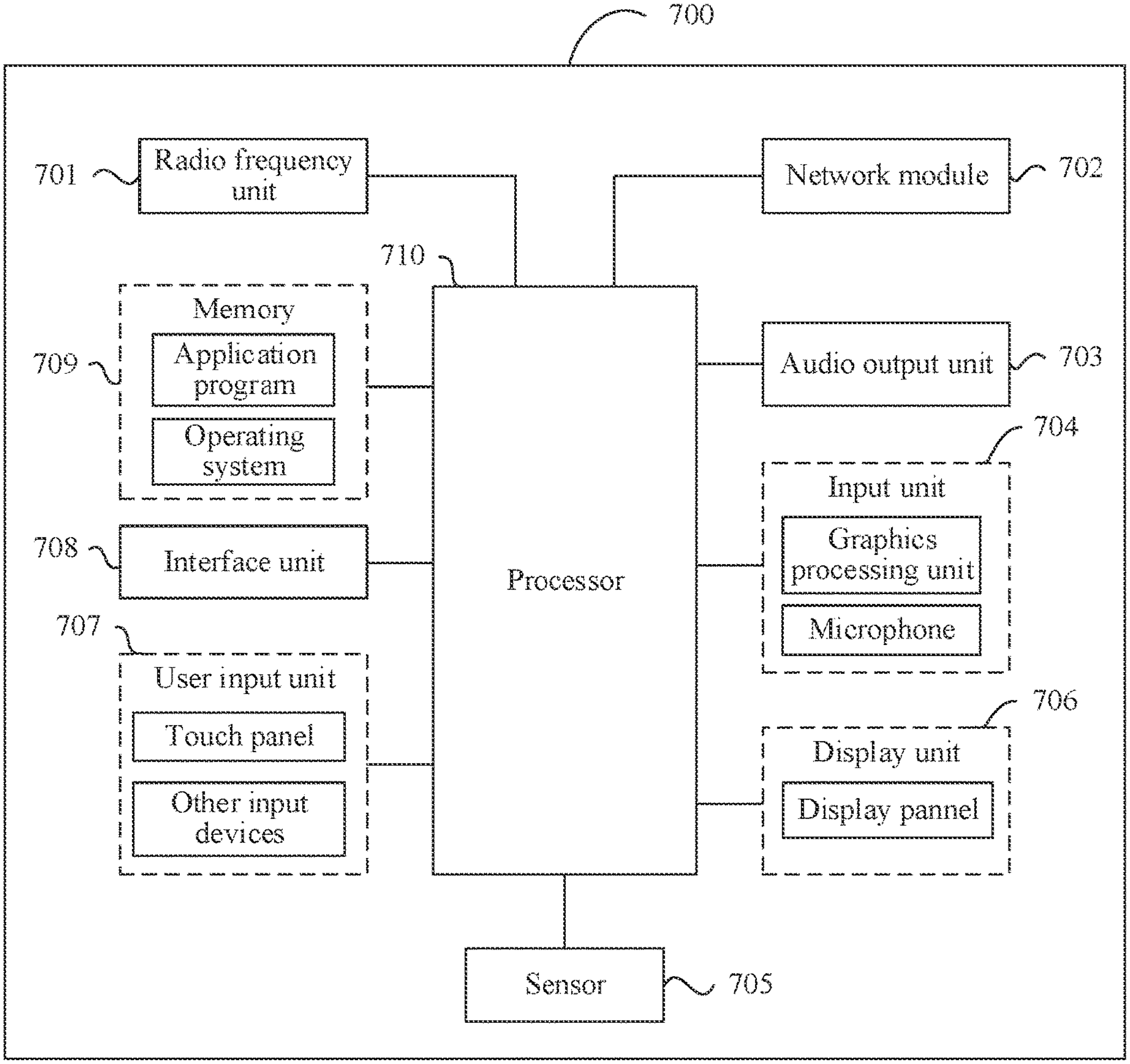
FIG. 7 is a structural diagram of a terminal according to an embodiment of this application.

The terminal embodiments correspond to the foregoing terminal-side method embodiments, and the implementation processes and implementations of the foregoing method embodiments can be applied to the terminal embodiments, with the same technical effects achieved. Specifically, FIG. 7 is a schematic diagram of a hardware structure of a terminal for implementing the embodiments of this application.

The terminal 700 includes but is not limited to at least part of components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power supply (for example, a battery) supplying power to the components, and the power supply may be logically connected to the processor 710 through a power management system. In this way, functions such as charge management, discharge management, and power consumption management are implemented by using the power management system. The structure of the terminal shown in FIG. 7 does not constitute any limitation on the terminal. The terminal may include more or fewer components than shown in the figure, or a combination of some components, or the components disposed differently. Details are not described herein again.

It can be understood that in this embodiment of this application, the input unit 704 may include a graphics processing unit (GPU) and a microphone. The graphics processing unit processes image data of a still picture or video obtained by an image capture apparatus (such as a camera) in a video capture mode or an image capture mode. The display unit 706 may include a display panel, and the display panel may be configured in a form of a liquid crystal display, an organic light-emitting diode, and the like. The user input unit 707 may include a touch panel and other input devices. The touch panel is also referred to as a touchscreen. The touch panel may include two parts: a touch detection apparatus and a touch controller. The other input devices may include but are not limited to a physical keyboard, a function key (such as a volume control key or a power on/off key), a trackball, a mouse, a joystick, and the like. Details are not described herein.

In this embodiment of this application, the radio frequency unit 701 receives downlink data from a network-side device, and then sends the downlink data to the processor 710 for processing; and also sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 109 may include a program or instruction storage area and a data storage area. The program or instruction storage area may store an operating system, an application program or instruction required by at least one function (for example, a sound playback function or an image playback function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-transitory solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

The processor 710 is configured to obtain target information, and determine, based on the target information, whether a target object uses a target transmission configuration indicator state TCI state; where the target information is specified by a protocol or indicated by a network-side device, the target object is at least one of a channel state information reference signal CSI-RS and a sounding reference signal SRS, and the target TCI state includes at least one of the following:

a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

The processor 710 in this embodiment of this application can implement the steps of the foregoing transmission processing method, with the same effects achieved.

An embodiment of this application further provides a network-side device including a processor and a communication interface, and the processor is configured to send target information to a terminal; where the target information is used to indicate whether a target object uses a target transmission configuration indicator state TCI state; where the target object is at least one of a channel state information reference signal CSI-RS and a sounding reference signal SRS, and the target TCI state includes at least one of the following:

a TCI state for a terminal-dedicated physical downlink shared channel PDSCH and for all or part of dedicated control resource sets; and a TCI state for a dynamic-grant or configured-grant based physical uplink shared channel PUSCH and for all dedicated physical uplink control channels PUCCHs.

The network-side device embodiments correspond to the foregoing network-side device method embodiments, and the implementation processes and implementations of the foregoing method embodiments can be applied to the network-side device embodiments, with the same technical effects achieved.

Figure 8:
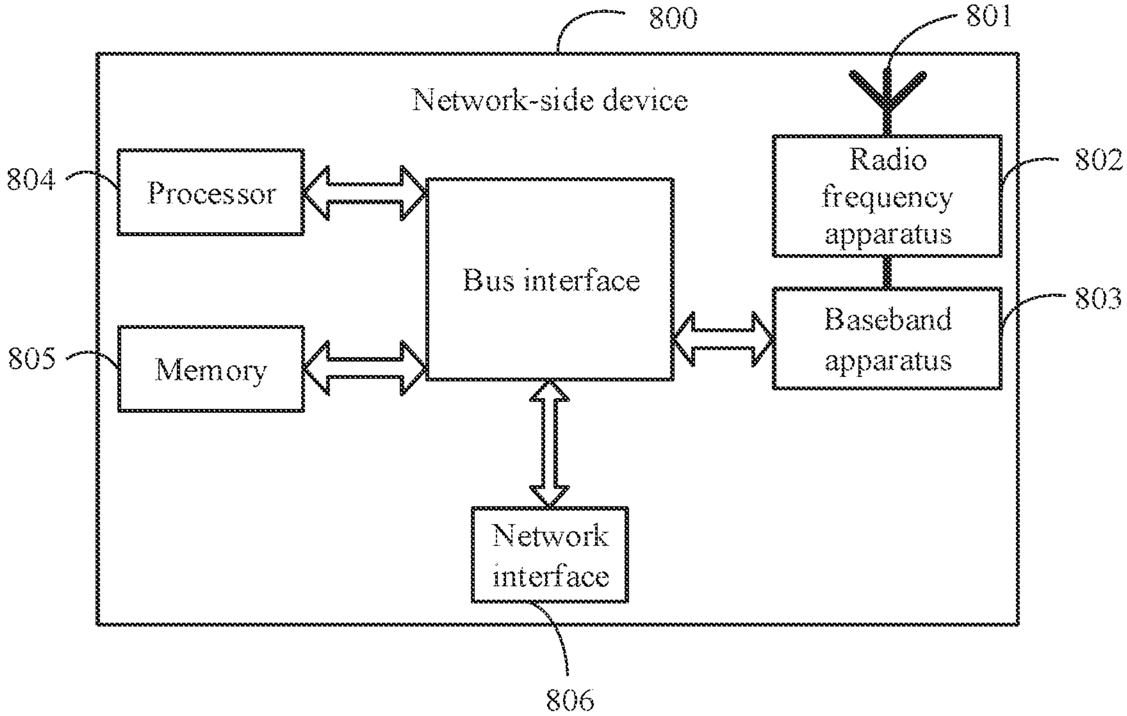
FIG. 8 is a structural diagram of a network-side device according to an embodiment of this application.

Specifically, an embodiment of this application further provides a network-side device. As shown in FIG. 8, the network-side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes to-be-sent information, and sends the information to the radio frequency apparatus 802; and the radio frequency apparatus 802 processes the received information and then sends the information out by using the antenna 801.

The frequency band processing apparatus may be located in the baseband apparatus 803. The method performed by the network-side device in the foregoing embodiments may be implemented in the baseband apparatus 803, and the baseband apparatus 803 includes a processor 804 and a memory 805.

The baseband apparatus 803 may include, for example, at least one baseband board, where a plurality of chips are disposed on the baseband board. As shown in FIG. 8, one of the chips is, for example, the processor 804, connected to the memory 805, to invoke a program in the memory 805 to perform the operation of the network-side device shown in the foregoing method embodiment.

The baseband apparatus 803 may further include a network interface 806, configured to exchange information with the radio frequency apparatus 802, where the interface is, for example, a common public radio interface (CPRI).

Specifically, the network-side device in this embodiment of this application further includes: instructions or a program stored in the memory 805 and capable of running on the processor 804. The processor 804 invokes the instructions or program in the memory 805 to execute the method executed by the modules shown in FIG. 5, with the same technical effects achieved. To avoid repetition, details are not repeated herein.

An embodiment of this application further provides a readable storage medium, where a program or an instruction is stored in the readable storage medium. When the program or the instruction is executed by a processor, the processes of the foregoing embodiments of the transmission processing method can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions to implement the processes of the foregoing embodiments of the transmission processing method, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product is stored in a non-transitory storage medium, and when being executed by at least one processor, the computer program product is configured to implement the processes of the foregoing embodiments of the transmission processing method, with the same technical effects achieved. To avoid repetition, details are not repeated herein. An embodiment of this application further provides a communication device, configured to perform the processes of the foregoing embodiments of the transmission processing method, with the same technical effects achieved. To avoid repetition, details are not described herein.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a base station, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A transmission processing method, comprising:

obtaining, by a terminal, target information; and determining, by the terminal based on the target information, whether a target object uses a target transmission configuration indicator state (TCI) state; wherein the target information is specified by a protocol or indicated by a network-side device, the target object is at least one of a channel state information reference signal (CSI-RS) or a sounding reference signal (SRS), and the target TCI state comprises at least one of the following:

a TCI state for a terminal-dedicated physical downlink shared channel (PDSCH) and for all or part of dedicated control resource sets; or a TCI state for a dynamic-grant or configured-grant based physical uplink shared channel (PUSCH) and for all dedicated physical uplink control channels (PUCCHs).

2. The method according to claim 1, wherein the target information satisfies at least one of the following:

the target information is used for indicating whether all of the target objects use the target TCI state;

the target information is used for indicating whether all target objects in a resource set corresponding to the target object uses the target TCI state;

the target information is used for indicating whether a resource corresponding to the target object uses the target TCI state;

the target information is used for indicating whether all target objects in a configuration corresponding to the target object uses the target TCI state; or the target information is used for indicating whether the target objects for different purposes use the target TCI state.

3. The method according to claim 1, wherein in a case that the target information is indicated by the network-side device, the target information is carried in any one of the following configuration information:

configuration information for a resource set of the target object;

configuration information for the target object;

configuration information for a resource of the target object;

configuration information for a cell to which the target object belongs;

configuration information for a bandwidth part (BWP) to which the target object belongs;

configuration information for a cell group to which the target object belongs; and configuration information for a frequency band to which the target object belongs.

4. The method according to claim 1, wherein in a case that the target object comprises an aperiodic first CSI-RS and a target condition is satisfied, a TCI state for the first CSI-RS is a first TCI state, a second TCI state, a third TCI state, or a fourth TCI state; wherein the target condition comprises: a time domain offset between a first PDCCH triggering the first CSI-RS and the first CSI-RS is less than a first preset value.

5. The method according to claim 4, wherein the first TCI state satisfies any one of the following:

the first TCI state is a TCI state used for a first downlink signal, the first downlink signal being transmitted in a same time unit as the first CSI-RS;

the first TCI state is the target TCI state;

the first TCI state is a TCI state indicated by the network-side device for the first downlink signal and the first TCI state is different from the target TCI state; and the first TCI state is a TCI state indicated by the network-side device for a second PDCCH, and the first TCI state is different from the target TCI state, wherein the second PDCCH is used for triggering or scheduling the first downlink signal;

wherein the second PDCCH for scheduling or triggering the first downlink signal is carried on a non-terminal-dedicated control resource set; or, wherein the first downlink signal is a first PDSCH or is an aperiodic second CSI-RS; or, wherein in a case that the network-side device indicates a plurality of TCI states, the first TCI state is the N-th TCI state in the plurality of TCI states, N is a second preset value, and the plurality of TCI states satisfy at least one of the following:

the plurality of TCI states are used for a terminal-dedicated physical downlink shared channel (PDSCH) and for all or part of dedicated control resource sets;

the plurality of TCI states are used for a dynamic-grant or configured-grant based physical uplink shared channel (PUSCH) and for all dedicated physical uplink control channels (PUCCHs);

the plurality of TCI states are used for the first downlink signal; or the plurality of TCI states are used for the second PDCCH.

6. The method according to claim 4, wherein the second TCI state is a TCI state for a periodic or semi-persistent second CSI-RS, the TCI state of the second CSI-RS is a TCI state different from the target TCI state, and the second CSI-RS is transmitted in a same time unit as the first CSI-RS.

7. The method according to claim 4, wherein the third TCI state is a TCI state for a first control resource set, and the first control resource set satisfies at least one of the following:

a control resource set pool index for the first control resource set is the same as a control resource set pool index associated with the first PDCCH;

an index of the first control resource set is a smallest control resource set index;

the first control resource set is located in a target slot closest to the first CSI-RS, and in the target slot, a control resource set pool index for at least one control resource set is the same as the control resource set pool index associated with the first PDCCH;

the first control resource set is located in the target slot closest to the first CSI-RS, and at least one control resource set is present in the target slot; or the first control resource set is located in an active bandwidth part (BWP) of a serving cell;

wherein in a case that the first control resource set is a terminal-dedicated control resource set, the TCI state for the first control resource set is the target TCI state; or, wherein in a case that the first control resource set is a non-terminal-dedicated control resource set and the network-side device indicates an intra-cell TCI state, the third TCI state satisfies any one of the following:

the third TCI state is the target TCI state; and the third TCI state is different from the target TCI state; or, wherein in a case that the first control resource set is a non-terminal-dedicated control resource set and the network-side device indicates an inter-cell TCI state, the third TCI state satisfies at least one of the following:

the third TCI state is different from the target TCI state;

the third TCI state is a TCI state associated with a physical cell identifier (PCI) of the serving cell;

the third TCI state is the target TCI state;

the third TCI state is a TCI state associated with a PCI of a non-serving cell; or the third TCI state is a TCI state for a default PCI.

8. The method according to claim 4, wherein the fourth TCI state satisfies at least one of the following:

the fourth TCI state is the target TCI state;

the fourth TCI state is a preset TCI state in a plurality of TCI states, and the plurality of TCI states is a plurality of target TCI states;

the fourth TCI state is a TCI state most recently indicated by the network-side device;

the fourth TCI state is a preset TCI state in a plurality of TCI states most recently indicated by the network-side device; or the fourth TCI state is a fifth TCI state; wherein the fifth TCI state is a preset TCI state in L TCI states, the L TCI states are one or more TCI states corresponding to a lowest TCI code point in all TCI states activated by the network-side device, or the L TCI states are a plurality of TCI states corresponding to a lowest target code point in TCI states activated by the network-side device, and the target code point is a TCI code point corresponding to at least two TCI states;

wherein the fourth TCI state is a fifth TCI state in a case that the first CSI-RS satisfies any one of the following conditions:

a transmission time of the first CSI-RS is located within a time period between activation of the TCI state by the network-side device and indication of the TCI state;

an interval between the transmission time of the first CSI-RS and a time for most recently indicating the TCI state by the network-side device is greater than or equal to a preset duration; and the network-side device reactivates a TCI state between the time for most recently indicating the TCI state by the network-side device and the transmission time of the first CSI-RS; or, wherein the plurality of TCI states satisfy at least one of the following:

at least two TCI states correspond to different control resource set pool indexes;

at least two TCI states correspond to different channel groups; or at least two TCI states correspond to different terminal panels.

9. The method according to claim 4, wherein the TCI state for the first CSI-RS is determined according to a target rule, the target rule comprising at least one of the following:

in a case that a first preset condition is satisfied, a second preset condition is satisfied, or a third preset condition is satisfied and neither the first preset condition nor the second preset condition is satisfied, the TCI state for the first CSI-RS is determined based on a preset rule;

in a case that a fourth preset condition is satisfied and none of the first preset condition, the second preset condition, and the third preset condition is satisfied, the TCI state for the first CSI-RS is the third TCI state; or in a case that the fifth preset condition is satisfied and none of the first preset condition, the second preset condition, the third preset condition, and the fourth preset condition is satisfied, the TCI state for the first CSI-RS is the fourth TCI state.

10. The method according to claim 9, wherein the first preset condition comprises: at least two different control resource set pool index values are configured for the terminal and a default beam is started for each control resource set pool index;

or, wherein the second preset condition comprises: a mode of enabling at least two default beams is configured for the terminal and at least one TCI code point corresponds to at least two TCI states during activation of the TCI state;

or, wherein the third preset condition comprises: a first downlink signal transmitted in a same time unit as the first CSI-RS is present;

or, wherein the fourth preset condition comprises any one of the following:

the network-side device configures at least one control resource set for a BWP in which the first CSI-RS is received;

the network-side device configures at least one terminal-dedicated control resource set for a BWP in which the first CSI-RS is received; and the network-side device configures at least one non-terminal-dedicated control resource set for a BWP in which the first CSI-RS is received;

or, wherein the fifth preset condition comprises: the network-side device configures a first parameter for the terminal, the first parameter being used to indicate starting a default beam used for cross-carrier scheduling.

11. The method according to claim 9, wherein the preset rule satisfies at least one of the following:

a first downlink signal transmitted at a same time as the first CSI-RS is present and, in a case that a first sub-condition is satisfied, the TCI state for the first CSI-RS is the first TCI state;

in a case that a second sub-condition is satisfied, the TCI state for the first CSI-RS is the second TCI state;

in a case that both the first preset condition is satisfied and the third sub-condition is satisfied, the TCI state for the first CSI-RS is the third TCI state; or in a case that the second preset condition is satisfied and the third sub-condition is satisfied, the TCI state for the first CSI-RS is the fourth TCI state;

wherein the first sub-condition comprises at least one of the following:

a second PDCCH for scheduling or triggering the first downlink signal is associated with a same control resource set pool index as the first PDCCH;

in a case that the first downlink signal is the first PDSCH, a time domain offset value between a PDCCH for scheduling the first PDSCH and the first PDSCH is greater than or equal to a first preset threshold; or in a case that the first downlink signal is an aperiodic second CSI-RS, a time domain offset between a PDCCH for triggering the second CSI-RS and the second CSI-RS is greater than or equal to a second preset threshold;

wherein in a case that the first downlink signal is an aperiodic second CSI-RS, the first sub-condition further comprises any one of the following:

the terminal has reported a first value and a second parameter is not configured for the terminal, wherein the first value is 14, 28, or 48, and the second parameter is used to enable beam switching timing;

the terminal has reported a second value and the second parameter is configured for the terminal, the second value being 224 or 336;

tracking reference signal information (trs-Info) is configured for the terminal;

the terminal has reported the second value, the second parameter is configured for the terminal, and a repetition parameter configured for the second CSI-RS is off, or neither the repetition parameter nor the trs-Info is configured for the second CSI-RS; and the terminal has reported the second value, the second parameter is configured for the terminal, and the repetition parameter configured for the second CSI-RS is on; or, wherein the second sub-condition comprises: a first downlink signal transmitted in a same time unit as the first CSI-RS is a periodic or semi-persistent second CSI-RS; or, wherein the third sub-condition comprises: a first downlink signal transmitted in a same time unit as the first CSI-RS is absent.

12. The method according to claim 1, wherein in a case that the SRS uses the target TCI state, a power control parameter for the SRS satisfies at least one of the following:

a pathloss reference signal uses a pathloss signal in the target TCI state or a pathloss signal associated with the target TCI state, or uses a source reference signal in the target TCI state, a quasi co-location type of the source reference signal being type D; and a target power control parameter satisfies a sixth preset condition, and the target power control parameter comprises at least one power control parameter in power control parameters of the SRS other than the pathloss reference signal; wherein the sixth preset condition satisfies at least one of the following:

the target power control parameter is associated with the target TCI state; or in a case that the target power control parameter is not associated with the target TCI state, a parameter value of the target power control parameter is a default value in candidate values or is a value indicated by the network-side device from the candidate values.

13. The method according to claim 12, wherein the candidate value is configured by at least one of the following: BWP configuration information, SRS configuration information, SRS resource set configuration information, or SRS resource configuration information.

14. The method according to claim 1, wherein the method further comprises:

when the terminal is in a carrier aggregation scenario, receiving, by the terminal, configuration information from the network-side device, wherein the configuration information is used to configure target parameter information, and the target parameter information is used to indicate a validation time of the target TCI state.

15. The method according to claim 14, wherein the target parameter information is carried in any one of the following configuration information:

configuration information for a frequency band;

configuration information for a component carrier (CC) list;

configuration information for a CC;

configuration information for a BWP;

configuration information for a cell; and configuration information for a PUCCH.

16. The method according to claim 14, wherein the target parameter information comprises at least one Y value, and the at least one Y value comprising any one of the following:

a Y value for each subcarrier spacing (SCS);

a Y-value for a first SCS, wherein the first SCS is an SCS of a BWP of a cell in which a PUCCH carrying an acknowledgement (ACK) of signaling for indicating the target TCI state by the network-side device is located;

a Y value for each BWP in a set of component carriers (CCs);

a Y value for each BWP in CCs within a frequency band; and one Y value shared by a plurality of first objects; wherein the first object is a target BWP, a subcarrier spacing (SCS) of the target BWP, a target CC, a CC list to which the target CC belongs, or a frequency band to which the target CC belongs; wherein the target BWP is a BWP in which a channel for applying the target TCI state is located, and the target CC is a CC in which a channel for applying the target TCI state is located.

17. The method according to claim 14, wherein after the receiving, by the terminal, configuration information from the network-side device, the method further comprises:

determining, by the terminal, a validation time for each BWP in each CC based on a second object; wherein the second object comprises any one of the following:

a BWP of a first CC, wherein the first CC is a CC in which a channel applying the target TCI state is located;

an SCS of the BWP of the first CC;

the BWP of the first CC and a BWP of the second CC, wherein the second CC is a CC in which an ACK of signaling for indicating the target TCI state by the network-side device is located;

the SCS of the BWP of the first CC and an SCS of the BWP of the second CC;

a BWP corresponding to a second SCS, wherein the second SCS is a smallest SCS in the SCS of the BWP of the first CC;

the second SCS;

a BWP corresponding to the second SCS and the BWP of the second CC; and the second SCS and the SCS of the BWP of the second CC.

18. A transmission processing method, comprising:

sending, by a network-side device, target information to a terminal; wherein the target information is used to indicate whether a target object uses a target transmission configuration indicator state (TCI state); wherein the target object is at least one of a channel state information reference signal (CSI-RS) or a sounding reference signal (SRS), and the target (TCI) state comprises at least one of the following:

a TCI state for a terminal-dedicated physical downlink shared channel (PDSCH) and for all or part of dedicated control resource sets; or a TCI state for a dynamic-grant or configured-grant based physical uplink shared channel (PUSCH) and for all dedicated physical uplink control channels (PUCCHs).

19. A terminal, comprising: a memory, a processor, and a program stored in the memory and capable of running on the processor, wherein the program, when executed by the processor, causes the terminal to perform:

obtaining target information; and determining based on the target information, whether a target object uses a target transmission configuration indicator state (TCI) state; wherein the target information is specified by a protocol or indicated by a network-side device, the target object is at least one of a channel state information reference signal (CSI-RS) or a sounding reference signal (SRS), and the target TCI state comprises at least one of the following:

a TCI state for a terminal-dedicated physical downlink shared channel (PDSCH) and for all or part of dedicated control resource sets; or a TCI state for a dynamic-grant or configured-grant based physical uplink shared channel (PUSCH) and for all dedicated physical uplink control channels (PUCCHs).

20. A network-side device, comprising: a memory, a processor, and a program or instructions stored in the memory and capable of running on the processor, wherein when the program or instructions are executed by the processor, the steps of the transmission processing method according to claim 18 are implemented.

* * * * *